United States Patent [19]

Bly et al.

[11] Patent Number: 5,220,657
[45] Date of Patent: Jun. 15, 1993

[54] UPDATING LOCAL COPY OF SHARED DATA IN A COLLABORATIVE SYSTEM

[75] Inventors: Sara A. Bly, Mountain View; Jeffrey D. Hodges, Newark; Michael D. Kupfer, Mountain View; Brian T. Lewis, Palo Alto; Michael L. Tallan, Mountain View; Stephen B. Tom, San Francisco, all of Calif.

[73] Assignee: Xerox Corporation, Stamford, Conn.

[21] Appl. No.: 685,361

[22] Filed: Apr. 15, 1991

Related U.S. Application Data

[62] Division of Ser. No. 127,993, Dec. 2, 1987, Pat. No. 5,008,853.

[51] Int. Cl.⁵ .................. G06F 9/22; G06F 13/10; G06F 13/14; G06F 12/02
[52] U.S. Cl. ............... 395/425; 364/228; 364/229.5; 364/238.4; 364/251.4; 364/243.41; 364/243.5; 364/243; 364/281.5; 364/271; 364/DIG. 1
[58] Field of Search ........... 395/600, 425, 200, 650, 395/400, 750, 775, 800, 159, 158, 153; 340/717

[56] References Cited

U.S. PATENT DOCUMENTS

| | | | |
|---|---|---|---|
| 3,771,137 | 11/1973 | Barner et al. | 340/172.5 |
| 4,410,944 | 10/1983 | Kronies | 364/200 |
| 4,445,174 | 4/1984 | Fletcher | 364/200 |
| 4,558,413 | 12/1985 | Schmidt et al. | 395/600 |
| 4,562,539 | 12/1985 | Vince | 364/200 |
| 4,641,262 | 2/1987 | Bryan et al. | 364/900 |
| 4,694,396 | 9/1987 | Weisshaar et al. | 364/200 |
| 4,698,752 | 10/1987 | Goldstein et al. | 364/200 |
| 4,714,992 | 12/1987 | Gladney et al. | 364/200 |
| 4,853,843 | 8/1989 | Ecklund | 364/200 |
| 4,914,586 | 4/1990 | Swinehart et al. | 395/600 |
| 4,974,173 | 11/1990 | Stefik et al. | 395/153 |
| 4,987,492 | 1/1991 | Stults et al. | 358/181 |
| 5,008,853 | 4/1991 | Bly et al. | 395/153 |
| 5,019,963 | 5/1991 | Alderson et al. | 395/600 |
| 5,072,412 | 12/1991 | Henderson, Jr. et al. | 395/159 |
| 5,107,443 | 4/1992 | Smith et al. | 395/158 |

OTHER PUBLICATIONS

Garrett, L. N., Smith, K. E., and Meyrowitz, N., "Intermedia: Issues, Strategies, and Tactics in the Design of a Hypermedia Document System," *Proceedings of the Conference on Computer-Supported Collaborative Work*, Austin, Texas, Dec. 3–5, 1986, pp. 163–174.

Stefik, M., Foster, G., Bobrow, D. G., Kahn, K., Lanning, S., and Suchman, L., "Beyond the Chalkboard: Computer Support for Collaboration and Problem Solving in Meetings," Communications of the ACM, vol. 30, No. 1 (Jan. 1987), pp. 32–47.

Interleaf Technical Publishing Software Reference Manual, Release 3.0, vol. 1, 1986, pp. 15-1–15-18, 16-1–16-19.

I. Greif et al., "Data Sharing in Group Work," *Conference on Computer-Supported Cooperative Work*, pp. 175–183, Dec. 3, 1986.

Sarin, S. K., *Interactive On-Line Conferences*, Ph.D. Thesis, M.I.T. Department of Electrical Engineering and Computer Science, May 1984, pp. 3, 47–57, 75–78 and 201–227.

Greif, I., Seliger, R. and Weihl, W., "Atomic Data Abstractions in a Distributed Collaborative Editing System," *Proceedings of the ACM Symposium on Principles of Programming Languages*, St. Petersburg, Fla., Jan. 1986, pp. 160–172.

Sarin, S. K., and Greif, I., "Computer-Based Real-Time Conferencing Systems," Computer, Oct. 1985, pp. 33–45.

Leblang, D. B. and Chase, Jr., R. P., "Computer-Aided Software Engineering in a Distributed Workstation Environment," in Henderson, P., (Ed.), *Proceedings of the ACM SIGSOFT/SIGPLAN Software Engineering Symposium on Practical Software Development Environments*, Pittsburgh, Pa., Apr. 23–24, 1984.

Sarin, S. K., and Greif, I., "Software for Interactive On-Line Conferences," *Proceedings ACM-SIGOA Conference on Office Information Systems*, Toronto, Canada, Jun. 25–27, 1984, pp. 1–29.

Trigg, Randall H., et al., "Supporting Collaboration in Notecards," *Conference on Computer-Supported Cooperative Work*, Dec. 3, 1986, pp. 153–162.

Aguilar, L., et al., "Architecture for a Multimedia Teleconferencing System," *Journal of the ACM*, 1986, pp. 126–136.

European Search Report and Annex, Application Number EP 88 31 1268, dated Sep. 16, 1992, transmitted with a Communication dated Sep. 28, 1992.

Lewis, B. T. and Jodges, J. D., "Shared Books: Collaborative Publication Management for an Office Information System," Conference on Office Information Systems, Mar. 23-25, 1988, Palo Alto, Ca., pp. 197-204.

Chu, W. W., "Design Considerations of File Directory Systems for Distributed Databases," Distributed Databases, State of the Art Report, Maidenhead, U.K., 1979, pp. 73-85.

*Primary Examiner*—Thomas C. Lee
*Assistant Examiner*—Daniel H. Pan

[57] ABSTRACT

A multi-user collaborative system in which the contents as well as the current status of other user activity of a shared structured data object representing one or more related structured data objects in the form of data entries can be concurrently accessed by different users respectively at different workstations connected to a common link. The WYSIWIS user interface representation of the shared structured data object includes an ordered listing of such entries that are maintained by the structured data object and various attributes of each listed entry, inter alia, the type and class of entry; the revision number of the shared structured data object; the number of pages and revision number of each structured data object entry; the date of creation and last revision of each such entry; whether an entry can be accessed by a user and, if not, who has prevented such access; whether a local instance of an entry is present on a user's system; and a provision for miscellaneous notes or comments relative to each entry for view by other users. Means is provided for maintaining current information relative to the shared structured object and its entries on a user initiated demand updated basis invoked by a user operation, which operation requires updated information to properly implement the operation. Further, means is provided for locking up one or more data entries by an individual user and thereby prevent access of the locked entries by other users to prevent concurrent editing and other changes to the same entries by two or more users. In this connection, editing or modification cannot be performed by a user until the shared structured data object entry or entries have been locked up. Visual indication as to the locked state of entries and other information relative to the locking user and the time of lock is updated and displayed in the shared structured data object representation present at user workstations when a use invokes a user operation on the shared structured data object or its contents.

5 Claims, 13 Drawing Sheets

UPDATING LOCAL COPY OF SHARED DATA IN A COLLABORATIVE SYSTEM

This is a division of application Ser. No. 07/127,993, filed Dec. 2, 1987, now U.S. Pat. No. 5,008,853.

CROSS-REFERENCE TO RELATED APPLICATIONS

This application contains subject matter related, in certain aspects, to the subject matter of patent application Ser. No. 07/485,793, now U.S. Pat. No. 4,974,173, which was a continuation of 07/127,814, now abandoned, filed Dec. 2, 1987, entitled, "Small-Scale Workspace Representations Indicating Activities by Other Users", assigned to the same assignee herein and incorporated herein by reference thereto.

BACKGROUND OF THE INVENTION

This invention relates to collaboration among users in a networked workstation system, i.e. a real-time computer-based cooperative, multi-user environment, through a multi-user interface. More specifically, the invention relates to the manner in which shared structured data objects containing some form of data is represented and controlled in a collaborative system together with means for presenting status and tracking information in a brief summary or compressed version to users so that the users are simultaneously aware of current changes to the status and activities in regard to shared structured data objects.

In a multi-user interface in a collaborative system, there must be an interface utility that permits multi-users to participate simultaneously together and share access to information relative to their participation. Such an interface may start from the so called WYSIWIS ("What You See Is What I See") abstraction, which is pronounced "wizzy whiz". This abstraction may be used to guide the multi-user interface design in a strict sense, i.e., where users see exactly the same image of information, i.e., all user's images are identical, and also users can see where users are cursively pointing to and changing information. On the other hand, this abstraction may be used to guide the multi-user interface design in a relaxed sense, i.e., wherein the images are not necessarily all identical at the same time with respect to one or more attributes, such as, display space, currency of displayed information, time of displayed information and congruence of view. The user interface of this invention falls in the relaxed WYSIWIS category.

A wide variety of user interface techniques are known for enabling more than one user to access a structured data object. In some techniques, a structured data object is only displayed to one user at a time, while in others, a structured data object is displayed to a number of users at the same time.

Recently, more attention has been given to multi-user environments and collaborative type systems and their user interfaces to provide for free and friendly accessibility among different users to shared data via, for example, structured data objects, and access and control of such shared data. An example of recent attention in collaborative environment research work was the Conference on Computer-Supported Cooperative Work (CSCW '86) held in Dec. 3-5 1986 in Austin, Tex. and the published proceedings from that conference.

The term, "structured data object", is used herein to generically mean a data object that contains a series of other data objects linked together in a predetermined manner which may or may not include a visual representation or functional abstraction on a display screen. Such data objects may have an associated set of operations and be linked to one another for one or more functional purposes. Examples of structured data objects are electronic versions of the following: (1) A multi-page document wherein each page is a data object linked to both preceding and subsequent pages, which are data objects, in a predetermined order (2) A workspace or desktop, as defined by the display screen per se which contains multiple structured data objects, e.g., file folders or documents, which, in turn, may contain other structured data objects. For example, a file folder may contain several documents, other file folders or a file drawer. A structured data object that is capable of holding other structured data objects is also referred to in the art as a "container", e.g., a file folder is a container for documents. An example of a container is the file folder of the MacIntosh Computer of Apple Computer, Inc., which, when opened on the display, may contain a plurality of other file folders displayed in their iconic representation of individual folders. (3) A hypertext linked structured data objects wherein individual workspaces or text window, themselves may be linked together in a predetermined manner. In U.S. patent application, Ser. No. 030,766, filed Mar. 25, 1987, now U.S. Pat. No. 5,072,412 entitled, "User Interface With Multiple Workspaces For Sharing Display System Objects", assigned to the assignee herein and incorporated herein by reference thereto, the term, "structured data objects" would include "display objects", "container" and "display system object" as defined therein.

The present invention deals with the employment of such structured data objects in a shared multi-user environment. In this context, the term "shared structure object" has reference to a structured data object that is accessible to more than one user through network coupled display workstations.

As is known in the art, the representation and display of structured data objects in a workstation environment may take various forms. A common technique is to present the contents or entries of structured data objects in a display region or workspace, such as a view window, on a CRT display. In order to maintain an unclustered display area in the displayed setting, however, it may be useful to provide a shrunken or small representation of the structured data object, such as an iconic representation, when a user is not engaging in activities relating to the structured data object. Such a representation of data may take the form of iconic representations of different structured data objects positioned on a workspace of a display screen, e.g., a display illustrating an office desktop metaphor employing various abstractions of a typical office environment, representative of real office objects, both physically accessible directly while seated at a desk or only physically accessible by moving from a desk to another office location away from the desk. Examples of these abstractions are a desktop, inbasket, outbasket, documents file folders and "books", which contains two or more consecutive document portions which together comprise a complete document. An example of such an office metaphor is the ViewPoint TM ("VP") software system available from Xerox Corporation in connection with its 8010 and 6085 display workstations. A more detailed description of this system and iconic representation therein is found in U.S. Pat. application, Ser. No. 856,525, filed Apr. 28, 1986, now U.S. Pat. No. 4,899,136 assigned to the assignee herein and incorporated herein by reference thereto.

A "book" in the ViewPoint software system is a structured data object of the container type and is a special directory that creates a relationship among the document portions that are contained in the book. Consecutive documents in a book can share a single page number series so that each document or a selected order of selected documents in the book automatically inherit sequential page numbering proceeding from document to document of the book. Also, scrolling from one document will automatically continue into the next sequential document. Further, there is a facility to automatically create a table of contents and index for the book which will automatically include content and indexing material into the table and index created relative to each document in the book. Lastly, the book will print as a single document. However, there is no facility in ViewPoint books for sharing the same book with other users. Each user may have a copy of the same book on his workstation, like any other document, but there is no facility for sharing information concerning the status and tracking of revisions created by other users to a book or documents contained in a book.

The ViewPoint ("VP") software system includes a form of "shared" structured data objects in the form of the file drawer abstraction, described in "Filing", *VP Series Reference Library*, Version 1.0, Xerox Corporation, 1985, pp. 1–60. As described at pages 4–7 and 20–21, a file drawer stores information on a remote file server, which is a physically remote accessible device so that the iconic representation is referred to as a reference icon on the desktop and is shown in half tone to represent this remote state. Structured data objects, such as file folders and documents digitally stored in a file drawer, can be shared by many users, in accordance with access rights, as illustrated at pages 40–43, i.e., users with access rights can access copies of data objects from the same file drawer. A file drawer is represented on the display by a relatively small icon with a pictorial file drawer representation with a name appearing within the representation. As explained in patent application Ser. No. 06/856,526, now abandoned and continued as Ser. No. 07/499,196, now U.S. Pat. No. 5,088,033, via a sequence of keyboard and mouse signals, the user can select the icon and request an <OPEN> operation, in which case a window appears on the display workspace showing the file drawer contents, as described and shown at pages 9–10 and 32–34. Unless covered by a window, the file drawer icon remains visible in shadow form while the file drawer window remains in its opened state. The user can subsequently close the file drawer window, in which case, the window disappears and the icon resumes its original solid iconic appearance. The ViewPoint system also includes other reference icons described at pages 11–15, 22–25 and 49–60, which can also be used to access in read only form "shared" structured data object.

Thus, relative to "shared" structured data objects located in a remote digital storage facility or file service represented as a file drawer abstraction of the desktop, it is important to note that access of a structured data object is possible by multiple users having proper access rights to the file drawer for placing a digital copy of a structured data object on the user's desktop for subsequent manipulation, editing, revision, insertion of new material, etc. In this sense, several users may access and share the same data or the same structured data objects, but individual users would be unaware of any changes made by other users unless other users restored the modified version of the structured data object back into the same file drawer and, further, other users periodically checked to see if and when an updated version of the structured data object may have been so restored, absent an electronic or phone message to other users informing them of the restored updated revision.

*Interleaf Technical Publishing Software Reference Manual*, Release 3.0, Vol. 1, 1986, pp. 15-1 through 15-18 and 16-1 through 16-19 describes features of Technical Publishing Software (TPS) that can be used similarly to the ViewPoint system's reference icons. Desktop links, described beginning at page 15-12, can be used to share files throughout a network, enabling a user to link to objects on other user's desktops, as further described at pages 15-17 and 15-18. In addition, every desktop has access to objects in the System cabinet through "desktop links". A link icon points to a real file stored elsewhere on a user's workstation or on a remote storage facility on a local area network. Using links allows multiple users to simultaneously change different parts of a shared data object, e.g., a publication. However, there is no efficient means available for providing information relative to shared file status and tracking.

Link permissions and ownership are described beginning at page 15-13, and the Document Locked stickup is described beginning at page 15-15 in the TPS Reference Manual. This stickup, shown in FIG. 15-9, includes a message with information about the lock on a document, as would occur if the document were already open, either through a link or at another workstation using the same desktop. The use of desktop links in a book, a special directory that creates a relationship among documents it contains, is described beginning at page 16-18.

There are references in the art for providing information to users of shared data about the activities of other users. S. K. Sarin et al, "Software for Interactive On-Line Conferences," *Proceedings ACM-SIGOA Conference on Office Information Systems*, Toronto, Canada, Jun. 25–27, 1984, describe a real-time conferencing system, RTCAL, in which a number of conference participants can each see a shared bitmap in a screen region, as shown in FIG. 3-2. Each user has a pointing device, such as a display cursor mouse, and when a bitmap server that supports the shared bitmap receives input indicating pointing activity by one of the users, that user's cursor is updated on every user's bitmap, as described in Section 3 at pages 15 and 18.

S. K. Sarin, *Interactive On-Line Conferences*, Ph.D. thesis, M.I.T. Department of Electrical Engineering and Computer Science, May 1984, also describes RTCAL, at pages 201–206. Elsewhere, at pages 47–57, Sarin describes JEDI, a real-time joint document editing system that includes a status window showing who is in a conference and other useful information about users, as described at pages 48 and 52 in relation to FIG. 2-4 and at page 57 in relation to a participant leaving a conference. Sarin discusses status information more generally at pages 75–78, pointing out ways in which a user can know what other users are doing and looking at. On page 78, Sarin points out that not all status information may fit on a user's screen at once, and suggests allocating a small amount of screen space to a main summary, with more detailed information available when needed by a "pop-up" viewport. Sarin further suggests special notification of significant changes in conference status, accompanied by an attention-getting mechanism, such as a bell ringing or flashing part of the screen, where the notification appears. Pages 206–213 describe "MBlink", in which each user can see the cursor positions of each user's workstation mouse. Pages 214–227 describe "XMBlink", a design that extends this feature.

S. K. Sarin et al, "Computer-Based Real-Time Conferencing Systems," *Computer*, pp. 33–45, October 1985, describe at page 34 a number of other systems providing information about activities of other users. FIG. 1 shows a summary window that provides further information about other users in a conference and an events window that displays important changes in status, such as, when a user is leaving or joining the conference or the passing of control to others, as described at page 36.

I. Greif et al, "Atomic Data Abstractions in a Distributed Collaborative Editing System," *Proceedings of the ACM Symposium on Principles of Programming Languages*, St. Petersburg, FL, pp. 160–172, January 1986, described a distributed collaborative editing system called "CES." The functionality and design of CES are described at pages 164–165, including the sharing of documents among multiple authors. While a "tickle" lock is held, small actions made by the owner are committed after certain editing commands and remain visible when the lock is released. Screens of all readers of text that is being modified are updated at regular intervals as each small action commits.

Gregg Foster, *CoLab, Tools for Computer-Based Co-operation*, University of California, Computer Science Division, Berkeley, California, Report No. UCB/CSD 84/215, 1984, describes the use of RemoteMice, personalized images of mouse cursors active on remote machines, at page 13. The relaxation of WYSIWIS ("What You See Is What I See"), discussed at page 8, permits differences between the views of a display object seen by different users, which could be implemented by associating windows of different sizes or screen positions or by providing visible remote cursors only on demand.

Gregg Foster in his Ph.D. Thesis, *Collaborative Systems and Multi-user Interfaces*, University of California, Computer Science Division, 1986, (and later in G. Foster et al, "Cognoter, Theory and Practice of a Colaborative Tool," *Proceedings of the Conference on Computer-Supported Collaborative Work*, Austin, Tex. Dec. 3–5, 1986, pp. 7–15) defines a multi-user interface as a human-machine interface coordinated for several users sharing information at the same time, at page 35. At page 36, Foster discusses the use in multi-user applications of compressed versions of windows in which general activity is discernible but details are suppressed, and suggests this as an approach to the screen space problem. FIG. 4.1 shows a shared window that is seen on the display of each participant in a session using Cognoter, a program that provides a multi-user interface and a structured meeting process. FIG. 4.3 shows how a number of windows may appear during a Cognoter session, with some windows overlapping others. Tables 4.1 4.2 and 4.3 show a "Scrunch" operation that shrinks a display window. At page 87, Foster discusses busy signals, illustrated in FIG. 4.9, that signal potential conflict between users by greying-out items being edited, moved or grouped by other users.

L. N. Garrett et al, "Intermedia: Issues, Strategies, and Tactics in the Design of a Hypermedia Document System, *Proceedings of the Conference on Computer-Supported Collaborative Work*, Austin, Tex., pp. 163–174, Dec. 3–5, 1986, although not itself prior art with respect to the present invention, describes Intermedia, a system that was publicly described in the prior art. Documents in Intermedia are linked, and a user can select a link marker and issue a command to cause the document at the other end of the link to be activated with information presented in a window. FIG. 2 shows how a link marker can be an icon conveying the nature of the information at the end of the link. A multi-user environment for a hypermedia system is described beginning at page 171. Options for notification of updates by other users, discussed on page 173, include immediate update, immediate notification, passive notification and no notification. One goal is a "seamless" environment over a large corpus of documents available to multiple users. This reference also, at page 173, refers to different aspects of the notion of notification of updates in a multi-user environment in that there are four possible ways a system could respond to other users relative to changes made to a system object: (1) provide an immediate update; (2) provide an immediate notification; (3) provide passive notification and (4) no notification. The last notion would not provide any formal notification of changes, but rather, the next time a document is opened, changes made by the user would somehow be reflected in the reopened document.

M. Stefik et al, "Knowledge Programming in Loops: Report on an Experimental Course," *The AI Magazine*, pp. 3–13, Fall 1983, describe *Truckin'*, a workstation board game in which each player has an iconic truck representation, as shown and described in relation to FIG. 5. Each player can have a separate workstation. Gauges described at pages 6–9 indicate the fuel, weight, and volume of each player's truck, and that can be concurrently observed by other players. Stefik, M. J., Bobrow, D. G. and Kahn, K. M., "Integrating Access-Oriented Programming into a Multiparadigm Environment," *IEEE Software*, pp. 10–18, January 1986 also describe gauges at pages 14–15 and *Truckin'* at pages 16–17.

Davids et al., U.S. Pat. No. 4,525,779, describe a conversational video system capable of providing interactive conversational video data communications between pairs of users and that enables multiple conversations to be carried out by a given user in real-time, as shown and described in relation to FIGS. 1–2. The display at a keystation can be divided into a plurality of areas that can include first and second conversation areas or a first conversation area and an area for retrieved data, as shown and described in relation to FIG. 11 and FIGS. 10A–10F. Another feature is an incoming calls area of the display containing brief details of incoming calls and their interest messages, and the user may accept one of the incoming calls shown in order to have it displayed in one of the conversation areas. A user can list others from whom he is not prepared to accept calls using a CALL INHIBIT function or can specify a list of others to whom a call is directed using a CALL LIST function, as shown and described in relation to FIGS. 14–43.

D. B. Leblang et al, "Computer-Aided Software Engineering in a Distributed Workstation Environment,"

in Henderson, P., (Ed.), *Proceedings of the ACM SIGSOFT/SIGPLAN Software Engineering Symposium on Practical Software Development Environments*, Pittsburgh, PA, Apr. 23-24, 1984, describe DSEE, a software development environment. As described and shown on the fifth and sixth pages, each user of a group of users can view the items completed by other users immediately, as a reference to the completed item.

G. Foster et al, "Cognoter, Theory and practice of a Colab-orative Tool", *Proceedings of the Conference on Computer-Supported Collaborative Work*, Austin, Tex., pp. 7-15, Dec. 3-5, 1986, which is not itself prior art with respect to the present invention, describes a computer program called "Cognoter" for use in a multi-user environment to provide collaboration among users participating in a group activity, such as a presentation, e.g., a talk or paper, wherein each user has an annotated outline of ordered ideas and associated text in a shared user interface present at each workstation. The user interface provides a visual indication to other users that a displayed item is undergoing alteration by another user.

In the article of M. Stefik et al, "WYSIWIS Revised: Early Experiences with Multi-User Interfaces," *Proceedings of the Conference on Computer-Supported Cooperative Work*, Austin, Tex., pp. 276-290, Dec. 3-5, 1986, which is not itself prior art with respect to the present invention, incorporated herein by reference thereto, there is a discussion at page 285, column one, about the problem in using the program, "Cognoter", G. Foster et al., "Cognoter, Theory and practice of a Colab-orative Tool", supra, that, when the windows are shrunk or reduced to their static icon representation, it is no longer possible for a user to assess quickly where a group activity is from moment to moment. The suggestion is made that, unlike conventional static icons, an icon representing the activity should somehow actively indicate when information concerning the group activity is changing. However, there no indication or suggestion in this paper as to how this suggestion would be visualized or implemented.

Relative to monitoring information among different users in a multi-user environment, there is known in the art the use of "system models" to monitor the activities of programmers working on different software modules together comprising a software system and determine how to rebuild or compile the system when one or more modules have been changed without losing modules or pointers to their remote locations. See, for example, U.S. Pat. No. 4,558,413, which corresponds to the dissertation of Eric Emerson Schmidt, entitled "*Controlling Large Software Development in a Distributed Environment*", University of California, Berkeley, approved November 1982, Brian T. Lewis, "Experience With a System for Controlling Software Versions in a Distributed Environment", *Proceedings of the Symposium on Application and Assessment of Automated Tools for Software Development*, IEEE and University of Texas at Austin, San Francisco, Calif. Nov. 1-3, 1983, and K. Marzullo et al, "Jasmine: A Software System Modelling Facility", *Proceedings of the Symposium on Practical Software Development Environments*, Palo Alto, Calif., Dec. 9-11, 1986, SIGPLAN Notices, Vol. 22(1), pp. 121-130, January, 1987. The system models used contain unique identifiers that are representative, for example, of a particular software module and contain pointers to information concerning its name, current version, its dependency on other software modules and its pathname to the storage facility where the module resides. However, there is no means provided for individual users to visually access on reduced scale or summarized basis, an entry detail representation of the current status of each module or part or entry of such a system, the current activity as to any particular module or part and whether access is available relative to a particular module or part.

A concept of a shared structured data object is disclosed in the published article of David K. Gifford, "Violet, An Experimental Decentralized System", CSL-79-12, Xerox Palo Alto Research Center, September, 1979. Violet is a decentralized information system with implementation at the file service wherein information is shared among multi-users. The user interface disclosed pertains to a shared appointment calendar wherein a user can take control of data entry to be made in a common appointment calendar by invoking a write transaction which sets an "intention-write lock". This lock is not final until converted into a "commit lock" so that a final write to the calendar for all users to see is arbitrated among multi-users relative to the first to commit after set of the intention-write lock by writing data to the user's displayed representation of the calendar.

It is a principal object of this invention to provide a means in the form of a representation indicative of the status of and tracking changes to shared structured data objects accessible as a multi-user application in a real-time collaborative environment without the need of keeping track of or identifying any of the remote instances of the representation. Thus, it is a prime objective of this invention to provide a multi-user environment and collaborative type system with a user interface that provides for free and friendly accessibility among different users to shared structured data objects and managing the shared structured data object throughout its life cycle to permit users to concentrate more on the structured data object substance processes and less on the management and production coordination processes.

SUMMARY OF THE INVENTION

According to this invention, a representation of a shared structured data object can be used to present information about the activities and status relating to the shared structured data object and its content of a plurality of structured data objects as well as other information affecting or tracking the shared structured data object content. The present invention further provides techniques by which the WYSIWIS user interface aspects of the representation can be used to present detailed quantitative information about the real-time extent of changes or modifications to the shared structured data object or its contents on a demand notification/update basis. Further, user access control also provides exclusivity or privacy to invoked changes to parts of the shared structured data object without interference from other users but with an indication to the other users of access control attributes thereby providing coordinated consistency among users relative to changes to all parts of the shared structured data object.

One aspect of the invention is based on the recognition of a basic problem in a collaborative system, i.e. a real-time computer-based cooperative environment. A user can often benefit from knowing the state of activities of other users even when that user is not actively engaged in such activities with the other users. For example, a user may need tracking information relating to statistics or status relative to the activities of other users to make decisions about future plans for such activities or a determination when to join in the group activities. In a collaborative system that permits concurrent access to shared data by more than one user, a user may wish to rejoin a group viewing shared data when the group has reached a certain stage in its work or when another user joins the group activities. Or, if the system allows more than one subgroup, a user in one subgroup may need information about the progress of another subgroup. But, a conventional collaborative system does not permit a user to conveniently monitor activities of other users unless the user is viewing the same data along with other users.

This aspect of the invention is further based on the recognition that this problem can be solved by displaying to the user a representation that includes detailed information about the activities of other users relating to shared data in a shared structured data object utilized in a collaborative system. Because the representation is small or of reduced scale, it does not interfere with the user's view of other objects present in the workspace on the workstation display desktop. A user can learn the current state of an activity by direct access to and view of the reduced size representation, making it unnecessary to view the shared data until the user is ready to do so or until a desired state or level of activity is reached. At that point, the user can begin working on the shared data by selecting the reduced size representation and designating a particular entry or entries identified in the representation and open them up for view and editing in full size presentation of the particular entry.

A variety of techniques may be used to indicate the activities of other users of the shared structured data object. When there is a change in data in a structured data object within a shared structured data object, the detailed representation could include a flickering indicator, for example. If the shared data is presented to each user as a display object or within a workspace, such as a display window, each representation may include the current version of that display object or workspace, with systematic distortions to enable a user to recognize it and with updating to indicate recent changes to the data. The representation could include an indication of which users are currently viewing and editing a particular entry of the shared structured data object and which users are only viewing the representation. The representation could also include an indication of the type of activity in progress by another user on a particular entry within the shared structured data object.

Another aspect of the invention is based on the recognition that a user viewing a representation of a shared structured data object is likely to make decisions based on how much change other users have made in the shared data of the shared structured data object or on how rapidly other users are making changes. When other users have made extensive changes, the user may wish to view the data with the changes or may wish to update a local instance of the shared structured data object. When other users begin making changes very rapidly, the user may wish to view the contents to determine the extent and necessity of the changes. The need for such information can be solved by including in a smaller size indicator of a quantitative measure of change that is updated as changes occur. The quantitative measure could indicate the cumulative amount of change or the current rate of change.

In the present invention, the above mentioned recognized capabilities are achieved in a multi-user collaborative system in which the contents as well as the current status of other user activity of a shared structured data object representing one or more related structured data objects in the form of data entries can be concurrently accessed by different users respectively at different workstations connected to a common link. The WYSIWIS user interface representation of the shared structured data object includes an ordered listing of such entries that are maintained by the structured data object and various attributes of each listed entry, inter alia, the type and class of entry; the revision number of the shared structured data object; the number of pages and revision number of each structured data object entry; the date of creation and last revision of each such entry; whether an entry can be accessed by a user and, if not, who has prevented such access; whether a local instance of an entry is present on a user's system; and a provision for miscellaneous notes or comments relative to each entry for view by other users. Means is provided for maintaining current information relative to the shared structured object and its entries on a user initiated demand updated basis invoked by a user operation, which operation requires updated information to properly implement the operation. Further, means is provided for locking up one or more data entries by an individual user and thereby prevent access of the locked entries by other users to prevent concurrent editing and other changes to the same entries by two or more users. In this connection, editing or modification cannot be performed by a user until the shared structured data object entry or entries have been locked up. Visual indication as to the locked state of entries and other information relative to the locking user and the time of lock is updated and displayed in the shared structured data object representation present at user workstations when a user invokes a user operation on the shared structured data object or its contents. In this manner, the updating of the representation is completely decentralized and client-based so that it is not necessary to monitor the number and currency of shared structured data objects existing throughout the network but, rather, updating of the representation of object content, as well as any modified data content of structured data objects, is accomplished upon individual user initial invoking of a structured data object operation.

Other objects and attainments together with a fuller understanding of the invention will become apparent and appreciated by referring to the following description and claims taken in conjunction with the accompanying drawings.

DETAILED DESCRIPTION OF A PREFERRED EMBODIMENT

Figure 1:
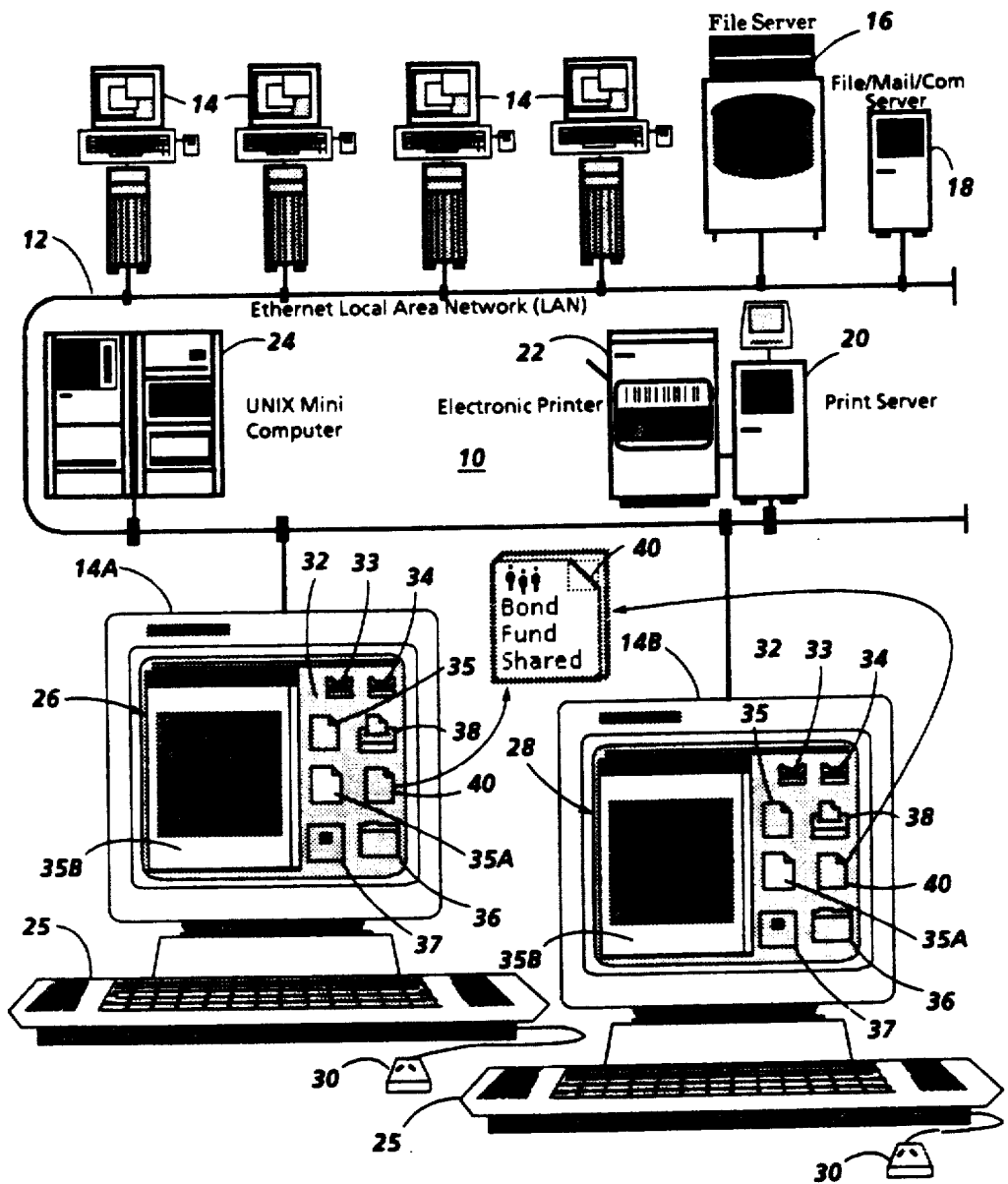
FIG. 1 is a diagrammatic illustration of an office information system for illustrating the shared structured data object comprising this invention.

A. Background Discussion and General Features.

General features of this invention can be understood with reference to the figures in explaining in detail the collaborative environment of this invention utilizing a shared structured data object as used in a publication management system modeled after "job dockets", a common publishing shop tool. However, it should be understood that the shared structured data object representation of this invention has other applications. For example, the shared structured data object representation of this invention could be utilized in a hypertext type system, e.g., NoteCards or a hierarchical database retrieval system.

Job dockets includes drafts of text and illustrations, galleys and page proofs, specifications for design and layout, correspondence, and production schedules. A "job sheet" is often pasted on a docket's cover to identify the job and list its production schedule, e.g., a list of tasks to be accomplished, scheduled dates for completion, and individual worker assignments. Job dockets are passed from one worker to another as each job step is completed. Unlike a job docket, however, shared structured data objects are intended to allow several professional users to edit or otherwise work concurrently on the same publication.

Publication or job management is a broad area encompassing topics as diverse as security, document history, and scheduling of publication jobs. There are three key categories of publication management: storage and retrieval, document binding, and job management.

A key requirement for any publication or job management system is support for efficiently finding, retrieving, and storing the correct revisions of documents. This must include all document information. A document is more than the sum of its parts. At the very least, the system must manage all the information necessary to reproduce the document. Beside content that belongs to just the document, this information might include style and layout rules, spelling dictionaries, boilerplate content shared among several documents, and information obtained by following links and cross references to other publications. The publication management system should manage such related information as contracts, specifications, correspondence, production schedules, and accounting data. The system must also manage any important derived information. This is information which is computed solely from publication entries in order to, for example, reduce the time needed for some operations. Specific examples include symbol table information needed to resolve cross references between parts and Interpress or Postscript page description files for printing of the publication.

Publications or documents are changed, modified and updated over time, which results in a sequence of revisions over time. Some documents are short-lived while others have a long revision history in which the functionality of publication management is paramount. These long-lived publications typically have major revisions that correspond to releases of the document. For example, a user's manual for a spreadsheet package is usually revised for each release of the package. It is desirable for a publication management system to be able to reproduce specific older revisions of a document as well as the current revision. Some publications also have, at certain times, multiple concurrent versions. For example, a computer user's manual might have several different versions, one for each computer model on which a software application runs. These different but related, parallel versions have their own independent revision histories which the publication management facility should manage separately. The facility should be able to recreate specific revisions within each separate version thread. If older revisions are not likely to be retrieved often, they version thread. If older revisions are not likely to be retrieved often, they can be archived into a slow-to-access but low cost per bit digital storage facility.

The publication or job management system in the modern office must reliably store information. It must safeguard data despite computer or network failures or attempts by unauthorized people to modify information. Loss or corruption of information can have financial, if not sometimes also legal consequences. Often there are tight deadlines and it is unacceptable to be forced to recreate a document from other sources. The system must prevent two different users from attempting to modify the same information at the same time. Part of the difficulty in management is in locating correct and current revisions of information and ensuring that revisions are properly distributed for review and further revision. Information can be lost if the system does not provide long-term, global locks on shared data. The publication management system should also provide access control to prevent unauthorized access and change to documents. Also to be noted is that the access controls that are appropriate for a publication often change over time, even among the same users. For example, no one within General Motors Corporation is allowed to alter or revise the owner's manual "safety copy" for an automobile after a draft of this publication has been approved by the corporate legal department.

Binding a publication typically consists of numbering a publication's content and layout objects, e.g., sections, figures, footnotes, and pages, and resolving cross references to those objects. It may also include the generation of front and back matter such as tables of contents and indexes. Binding is typically done by an editor program, not by the publication management system. However, when the publication consists of several independently edited pieces or units, the binding functionality will require the assistance of the publication management system to obtain correct revisions of document parts and other needed information.

When several people are working on a publication, there is the problem of checking whether the publication is consistent. A publication is consistent if all of its parts, including the front and back matter, are numbered and cross referenced consistently. In addition, the publication's parts must also refer to the same revisions of such auxiliary information as style descriptions and boilerplate content, whether that information belongs to just the publication or is "imported" from elsewhere. Although an editor program might implement the consistency checking, the checking is a publication management function. Cross references to other publications must also be identical. The document management system can keep track of revision and binding information for each part in order to determine efficiently if the document is consistent.

A publication management facility offers support for organizing the production of documents. It assists in planning tasks and responsibilities and in tracking the progress of work. It may also include support for estimating the cost of jobs and for maintaining accounting and statistical information. Besides assistance for producing individual documents, a job management system may also provide between-job support. This includes peak-load reports for production departments and reports of jobs currently in progress. The job management system should recognize that there are different work roles involved in publishing: for example, writing, designing, copy editing, and production editing. These roles often have different requirements. For example, an illustrator rarely should be allowed to revise a job's accounting information, although the same person may sometimes perform these different roles.

Flexibility is another requirement for publication management systems. They must accommodate different production styles. Most publishing groups are highly organized and publishers will often refuse to change their existing procedures to accommodate a new or different job management system.

In the modern office, managing long-lived, multi-part documents or publications has always required additional time for office workers. This is, in part, because the documents are produced by a team of people and undergo frequent revision. When several people work together to produce a document, coordinating and tracking the progress of their work also requires work. This includes locating current and revised revisions of the different publication parts for further processing. Even in the "electronic office", the publication management is still done primarily using manual techniques. Mistakes are occasionally made, which lead to increased cost, missed deadlines, and sometimes the loss of information.

The collaborative system of this invention invoking a structured data object representation supports multi-user publication management on the existing ViewPoint ("VP") software system of Xerox Corporation and its document processing environment. A typical VP office information system consists of a number of workstations linked by an Ethernet local area network to shared file, communication, and print services. Each workstation has its own local file system. Sharing is done using files stored on file services but files must be manually copied between workstations and servers. VP also has a distributed electronic mail system. These existing facilities help in preparing documents, but they still require manual and coordinated effort and, therefore, are subject to error, particularly relative to information about status and coordination of efforts. This is especially true when several workers are involved and when the publication consists of several independently edited parts. For example, two users may simultaneously edit separate copies of the same document, or one may be unable to locate on the system all correct parts of a multi-part publication. These and other problems of publication management are solved through the application of this invention, permitting users to concentrate more on the publication processing aspects and less on the management and production processing aspects.

Copending, coassigned U.S. patent application Ser. No. 07/127,997, now continued as Ser. No. 07/570,984; entitled "Multiple Shared Virtual Workspaces", and incorporated herein by reference, relates to the sharing of information and workspaces in a collaborative environment. In addition to the explanation set forth in that patent application as well as in U.S. patent application Ser. No. 07485,773, now U.S. Pat. No. 4,974,173, which was a continuation of 07/127,814, now abandoned, the present invention involves the notion of a particular representation of shared structured data objects. The term, "shared structure object" is used herein to refer to any structured data object that is accessible to more than one user. A representation of a shared structured data object is any way of displaying shared data represented by the object and its contents, whether as a simple display object, as the contents of the entire display screen, or as the contents of any workspace, whether the workspace is thought of as a room, a window, a blackboard, a sketchpad, a spreadsheet, a card or any other type of entity for presenting data within an area of a display. A representation may be at full scale, occupying a substantial part of the display area, in which case the details of the shared data will ordinarily be visible to a viewer, albeit in some mapped form, such as, a sequence of characters or a bitmapped graphical object. Such a body of shared structured data objects may be amenable to many different full scale representations, as when a document can be displayed page-by-page in a desired sequence. A representation may also be at a small scale, occupying a small part of the display area, in which case, the details of the shared structured data object may not be visible. A small scale representation may also be a small portion of the full scale representation of the same shared data, showing details relating in specific ways to or attributes of the shared structured data object; it could be a shrunken version of the full scale representation of a structured data object, showing some general features of the full scale representation but omitting details; a reduced scale representation could also be an icon or other small display abstraction that shows virtually none of the features or attributes of the full scale representation other than an identifier such as a name or configuration of a structured data object.

Due to the limits of human perception and the typical display size, the smallest reduced scale representations of a structured data object frequently have a fixed size of about one square inch or less, e.g., an icon symbol. The size of a reduced scale representation is typically large enough to have a characteristic shape and an identifier. Such a representation may not itself enable the user to access the corresponding data, but it may typically be selected as part of an operation to obtain a full scale representation of the corresponding data. Full scale representations, on the other hand, are often variable in size and can range from a few square inches up to the full available display area, typically enabling a user to select a display object within the full scale representation upon which an operation is to be performed, resulting in access to the corresponding data. Many conventional graphical user interfaces have readily identifiable full scale and reduced scale representations of data, respectively, such as windows and icons. The structured data object representation of this invention involves attributes of both reduced scale and full scale representations.

Reference is now made to a typical office information system 10 illustrated in FIG. 1. System 10 includes an Ethernet local area network (LAN) 12, to which a number of user workstations 14, including workstations 14A and 14B, are connected. Workstations 14 may be, for example, the Xerox 6085 professional workstation. LAN 12 may also have other office connected equipment such as network file server 16, network file/mail/-communication server 18, printer server 20 and printer 22. Also, a large capacity remote storage facility, such as a UNIX mini computer 24 may be connected to LAN 12. System 10 is a collaborative type system, meaning that it enables users at different workstations 14 to work together in real-time by processing and passing information among one another and storing and retrieving information from storage services 16 and 24 via network 12. The collaborative functions of system 10 could also be centralized in a single main CPU, could be distributed among processors at the workstations, or could be provided in any combination of centralization and distribution. Similarly, LAN 12 could take any appropriate configuration capable of providing the necessary communications to support collaboration.

System 10 includes display-based user interfaces, with each workstation 14 including a display device and a user input device. In this connection, workstations 14A and 14B illustratively include respective CRT display screens 26 and 28 and keyboards 25, each with a display cursor mouse 30. System 10 includes an object oriented display system that comprises iconic representations of different structured data objects positioned on a workspace of a display screen, e.g., a display illustrating an office desktop metaphor employing various abstractions of a typical office environment, representative of real office objects. An example of such an office metaphor is the ViewPoint TM ("VP") software system available from Xerox Corporation in connection with its 8010 and 6085 display workstations. Examples of these abstractions in FIG. 1 are a desktop 32, inbasket 33, outbasket 34, documents 35 and 35A, file folder 36, file drawer 37 and printer 38. Document icon 35A is shown "opened", in that an <OPEN> command has been invoked and opened window 35B has appeared displaying the document in full scale. Printer 38 is an iconic representation of printer 22 on LAN 12. A document 35 can be moved, via a <COPY> command, from keyboard 25 onto printer icon 38 and will be printed at printer 22. Electronic mail is received and sent via a workstation inbasket 33 and outbasket 34, respectively, from and to other workstations on LAN 12 or to workstations on other networks via File/Mail/-Com server 18.

B. User Interface For Shared Structured data objects.

The desktop 32 of workstations 14A and 14B also include a shared structured data object 40, which is shown in larger detail between workstations 14A and 14B. This shared structured data object corresponds to a container of related structured data objects, and the data content of the related structured data objects enable users at different workstations to work together in real time. The contained bodies of related structured data objects need not be mutually exclusive.

In the publication embodiment illustrated here, the shared structured data object 40 is also hereinafter referred to as a "shared book", taking the basic attributes of VP "books", explained in the Background of the Invention. Like a VP book, a shared book 40 is a container that has a plurality of related structured data objects which are called entries, e.g., VP documents and/or Interpress masters or files. Shared book 40 is shown in half tone, indicating that it is a reference icon having a remote location on a remote file service, such as file server 16. However, the implementation of shared books is client-based and runs on workstations 14.

In the particular embodiment here, shared book 40 shown in FIG. 1 is a local instance of the shared data comprising a multi-part publication identified as "Bond Fund Shared Book". A local instance of shared book 40 may appear at several workstations 14. A user's interaction with shared books 40 is designed to be as conventional as possible with the VP metaphor. Standard operations with which the user is already familiar, such as copying and editing of documents, work the same way relative to this shared object as they do on desktop 32.

Figure 2:
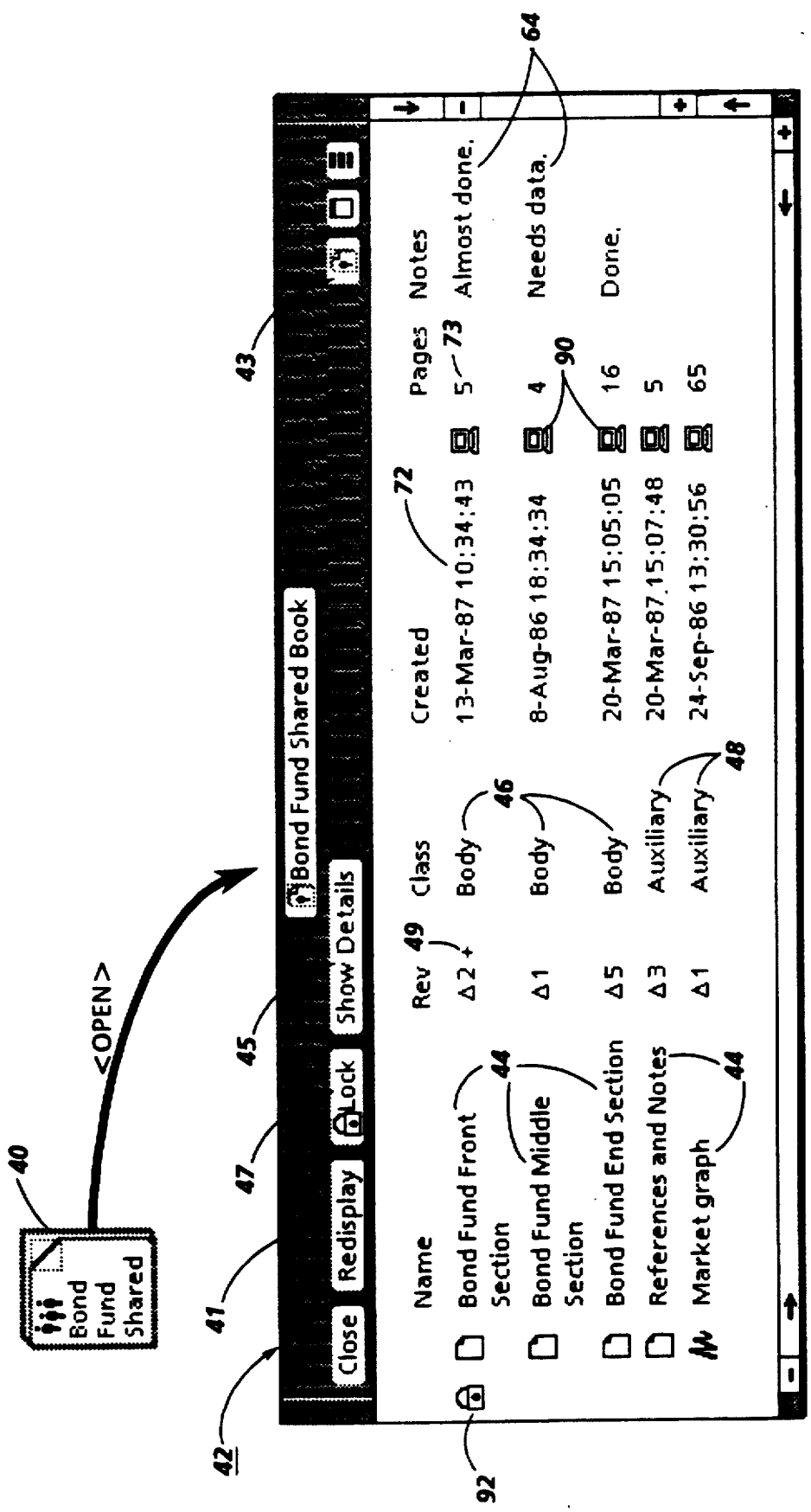
FIG. 2 illustrates a representation of a shared structured data object having a content that includes a plurality of entries which may be viewed as a window on a workstation display shown in FIG. 1.

Shared book 40 has its own window representation 42 (FIG. 2). This representation is one of various types of property sheets, to be discussed, which have been designed to convey a maximum amount of useful information in an easily readable format. An entry 44 within shared book 40, e.g. a VP document, is exactly the same instance as when the entry is on desktop 32. The usual editing, copy, move, and delete operations of VP may be applied as long as the user has the proper access rights to an entry 44 in shared book 40.

A user's access to shared book 40 and its contents comes in two forms. The first form is the standard access rights of read, write, add, and delete permission known in VP world. A user may not open or view the contents of a particular shared book without at least read access rights.

The second form of access rights is specific to the shared books implementation and is a direct consequence of its multi-user environment. Each shared book 40 must be protected from multi-users simultaneously changing its contents or its properties. This is necessary in order to prevent different users from overwriting each other's changes or revisions of shared data. This second form of access is extended to shared book 40 as a whole, which is an important aspect of this invention.

The shared book application on workstation 14 is a client-based transaction system wherein transactions relative to information on a remote file service are implemented by client processes communicating with one or more remote file servers as disclosed in detail in the publications of William H. Paxton entitled, "A Client-Based Transaction System To Maintain Data Integrity", CSL-80-3, Xerox Palo Alto Research Center, March, 1980, also in the *Proceedings of the Seventh Symposium on Operating Systems Principles*, pp. 18-23, Dec. 10-12, 1979, Pacific Grove, Calif., which is incorporated herein by reference thereto. Further, the shared book application utilizes a simple, conventional database system and database manager to perform this second form of access rights. An example of a database system is the Alpine file system disclosed in the publication entitled, "The Alpine File System" by Mark R. Brown et al, CSL-84-4, Xerox Palo Alto Research Center, October, 1984, which is incorporated herein by reference thereto. The Alpine file system provides the programmed utility of providing long term locks on designated records in the database or file. Sun Microsystems, Inc. is also offering a database product that provides for programmed locking capabilities.

While it is well known in the art, a simple explanation of file service terminology is as follows. A file service consists of a digital storage facility to store large amounts of information in digital form, and the database manager is a computer program facility for accessing, reading, writing and searching records in the database. A "record" is a basic data entry unit of a database. Each record contains a number of "fields" which store information about the content of a record or are the record content per se. A number of similar records, therefore, comprise a "database", also referred to as a "file". A "transaction" is a set of steps or procedures which take the database, or a record therein, from one consistent state to another consistent state by modifying the fields of one or more records. Using one of the above mentioned file systems, it is possible to lock out a record being accessed and used by a user while all other records remain accessible to all other users.

Each shared book 40 at the time of its creation has its own record registered with a file service or a file service that has database service capabilities. A database service supports one or more databases of records. In shared books 40, a record is a named property list or a number of "fields" within a particular database, i.e., a list of attributes characteristic of a record, such as a remote file name, checking in and checking out of files and by whom. Each of the properties on the list is tagged with a name. The database service supports applications that do simple queries and edits on these records and the actual properties contained within each record are, therefore, determined by the particular application. With respect to the shared books application, some of the properties for shared books 40 are the shared book's name, its database service, its file service, its user access list, the number of remote versions of each shared book entry to be maintained on the file server and notes regarding the entries.

A database service is specified by the user at the time a new shared book is created. Thereafter, the database service assigns to shared book 40 and each of its entries 44 a distinct record and registers the record with this database. The database service then keeps track of which entries 44 are locked and by whom. Users cannot explicitly lock shared book 40 per se, but certain user operations, such as pagination, can cause shared book 40 to be locked for a brief time as against all users. This prevents two users from simultaneously changing the content or attributes of shared book 40 during such an operation. Typically, each organization will share a single database for their publications. Each database service, such as supported on file server 16, can support several distinct databases. Each database can support multiple shared books 40. Every transaction to be performed in connection with shared book 40 checks first to determine whether the shared book's record is available. If it is not, then shared book 40 is determined to be locked and the transaction terminates. If the shared book record is available, then the transaction can proceed with shared book updating, if necessary, and further user invoked operations. Locking and unlocking a shared book's record is accomplished automatically and is invisible to the user, i.e., the user receives no visual indication of record locking or unlocking other than an indication of failed action indicative itself of a current locked state.

Shared book 40 resides in a particular subdirectory on a particular file service, such as file server 16. A user specifies the remote location where shared book 40 is to reside at the time the user initially creates a particular instance of a shared book 40 from a blank shared book prototype shown at 40' in FIG. 3. Shared book 40 and all of its related structured data objects or entries therein will be maintained at this specified location. The shared books application automatically stores such entries to and retrieves entries from a specified file server 16.

A blank shared book icon 40' can be electronically retrieved from a prototype folder in the directory icon on desktop 32. The directory icon is explained in detail in U.S. patent application Ser. No. 856,525 now U.S. Pat. No. 4,899,136. The prototype shared book icon 40' cannot be opened to view its contents until the properties of a shared book 40 have been properly assigned to the object via a property sheet. A property sheet can be obtained by, selecting the blank shared book icon 40' and invoking a <PROP'S> key from keyboard 25. Such a property sheet and the invoking thereof is explained in detail in U.S. patent application Ser. No. 856,525 now U.S. Pat. No. 4,899,136. The sole purpose of blank shared book 40' is to enable the user to create new shared books and to obtain local instances of previously created shared books 40. The name "Blank Shared Book" is reserved for this prototype 40' so that when a shared book 40 is created, a different name must be given to prototype 40'.

Shared book 40 may contain many different types of structured data objects. This allows the user to maintain in one location both the files that make up a publication and the publication support files. Among the permissible types of such objects that may be placed in shared book 40 are VP documents with graphics, VP documents of simple text, ASCII and Wordstar files, mail notes, spelling and hyphenation dictionaries and VP spreadsheets. Two types of structured data objects are not allowed in a shared book 40. Shared books do not have hierarchical capabilities, hence container type structured data objects may not be placed in shared book 40. This class of structured data objects includes folders, record files, books, and shared books themselves. The second kind of structured data objects that are not allowed in shared books 40 are reference icons, explained in U.S. patent application Ser. No. 856,525, now U.S. Pat. No. 4,899,136.

FIG. 2 shows an open shared book window 42, which is invoked by the function key <OPEN> from keyboard 25. Shared book window 42 contains a listing of all entries 44 that are contained in shared book 40. Each entry 44 corresponds to a part of a publication, for example, and the entries are displayed in the order of their appearance in the publication. In this manner, window representation 42 resembles a table of contents. However, this representation goes beyond content identification. All entries 44 are owned by shared book 40, i.e., entries 44 are stored with the real, remote shared book 40 at server 16. Users can either modify entries 44 within shared book window 42 by invoking the <OPEN> command from keyboard 25 on a previously selected entry 44 or they can <COPY> entries 44 to their desktop 32, edit them, and then <COPY> entries 44 back into shared book 40. Alternatively, the shared book application can function to produce a separate independent window on desktop 32, such as window 35B in FIG. 1, vis a vis window 42, upon invoking the <OPEN> command from Keyboard 25 on a previously selected entry 44. This function is similar to function selection of an iconic representation and invoking an <OPEN> command.

Each entry 44 is classified under the column headed by "Class" in property sheet 42 as being either a "Body" entry 46 or an "Auxiliary" entry 48. Body entries 46 comprise the data content, which are generally comprised of the publication content, such as VP editable documents. Body entries 46 participate in pagination, table of contents generation, and index generation. Auxiliary entries 48 are aids or other information used or referred to in creating entries, such as, index exception/inclusion dictionaries, Interpress files, and correspondence related to the publication comprising entry bodies 46. It is up to the user to classify entries as being either "Body" or "Auxiliary". The fault classification for a new entry 44 is "Body".

Shared book window 42, besides containing the names of entries 44 under the column, "Name" and classes 46 and 48 under the column, "Class", includes information about entry lock status, such as by the presence or absence of the lock icon 92 in FIG. 2 next to the first named entry, a revision number for each entry under the column, "Rev", which is a number that will be incremented when an edited entry is "Saved", which operation will also make the revision available to other users, a creation data at 72 under column, "Created" which is the timestamp of the most recently saved revision, the number of pages at 73 for each listed entry under the column, "Pages", and a column for "Notes" at 64 relative to each entry for a user to enter status information or other comments about entry 44.

Figure 3:
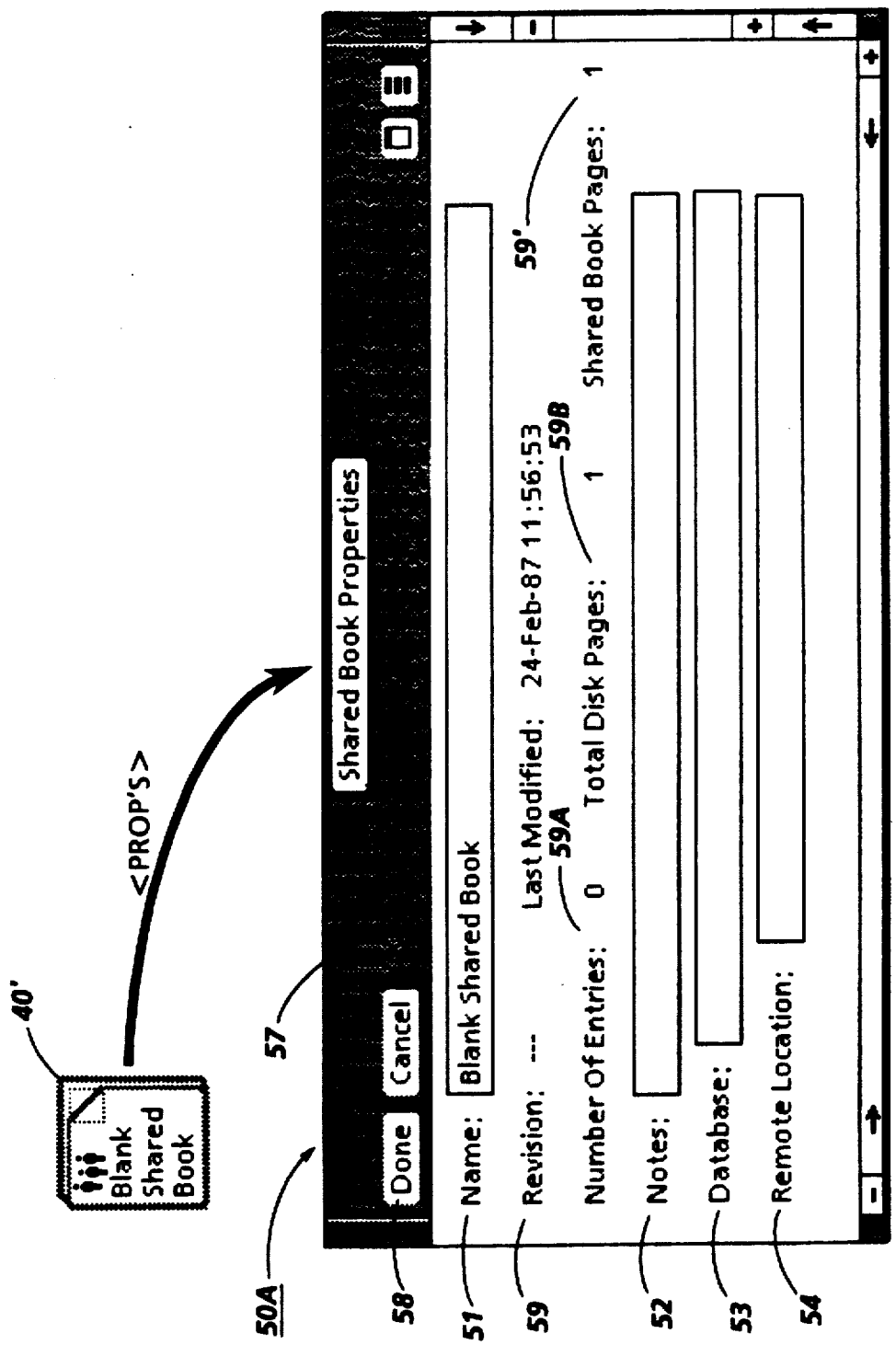
FIGS. 3 illustrates a property sheet for a blank shared structured data object as may be viewed on a workstation display shown in FIG. 1.
Figure 4:
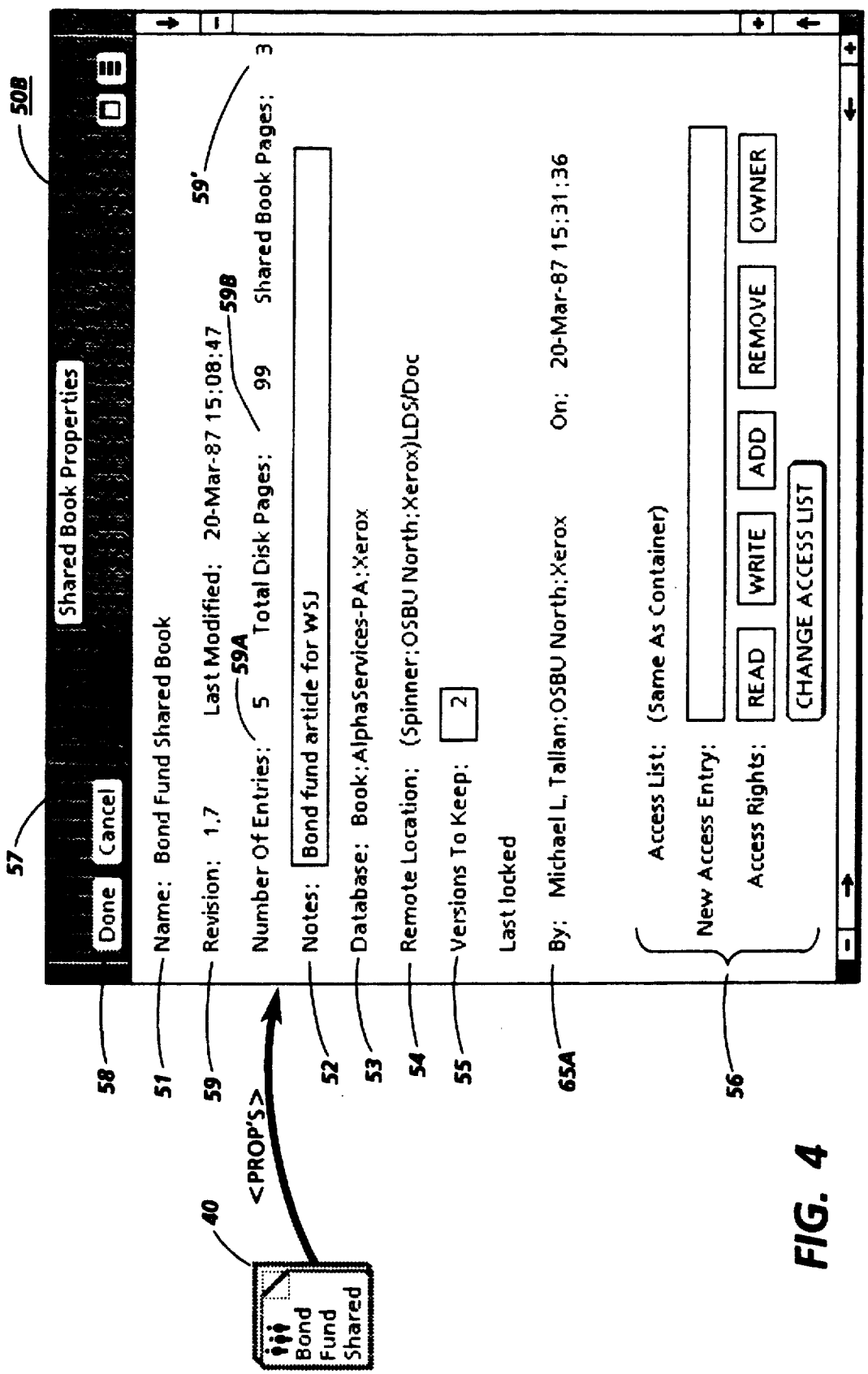
FIG. 4 illustrates a property sheet for a previously created shared structured data object as may be viewed on a workstation display shown in FIG. 1.
Figure 5:
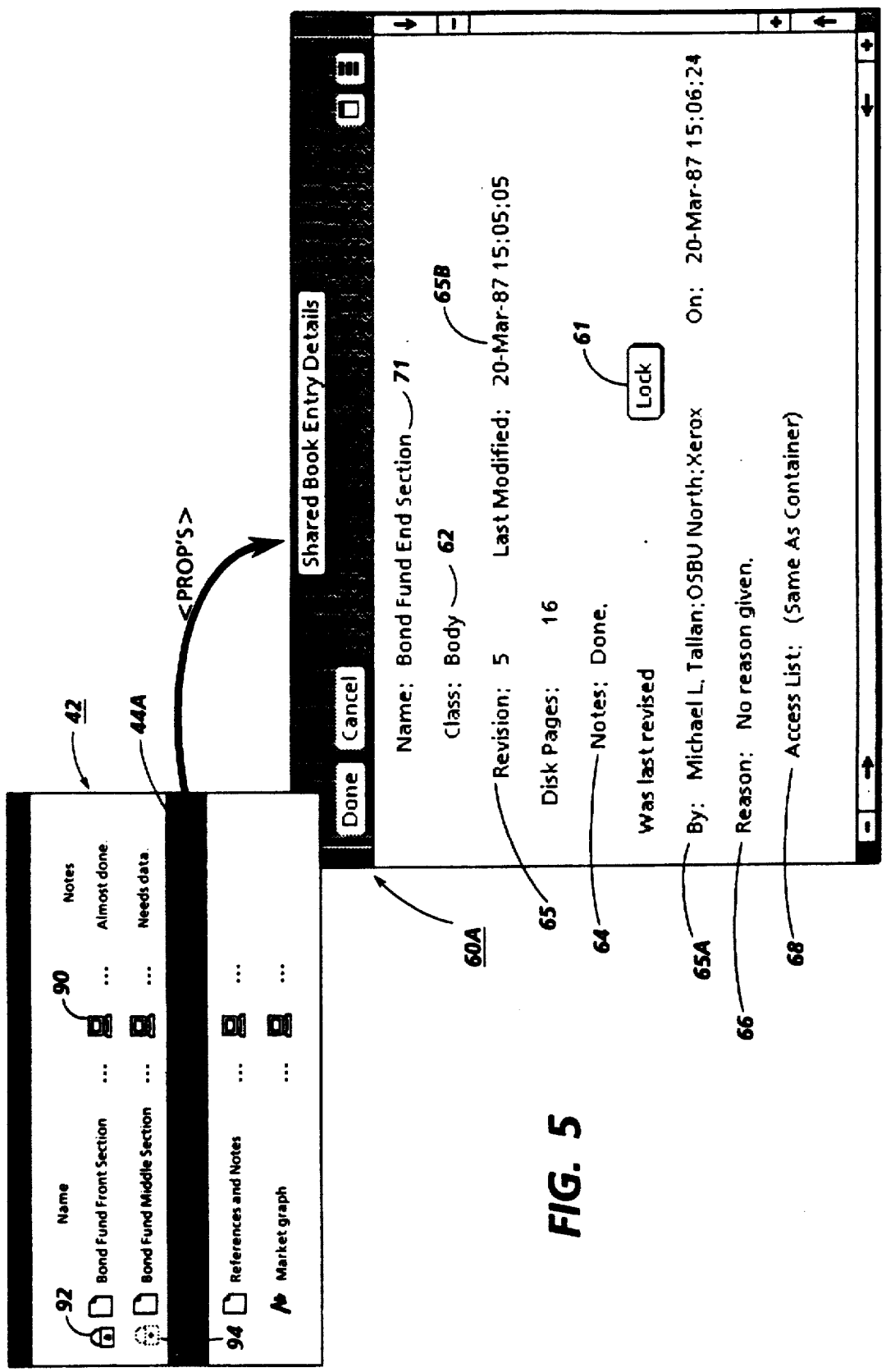
FIG. 5 illustrates a details options sheet for an unlocked entry in the shared structured data object window shown in FIG. 2 as may be viewed on a workstation display shown in FIG. 1.
Figure 6:
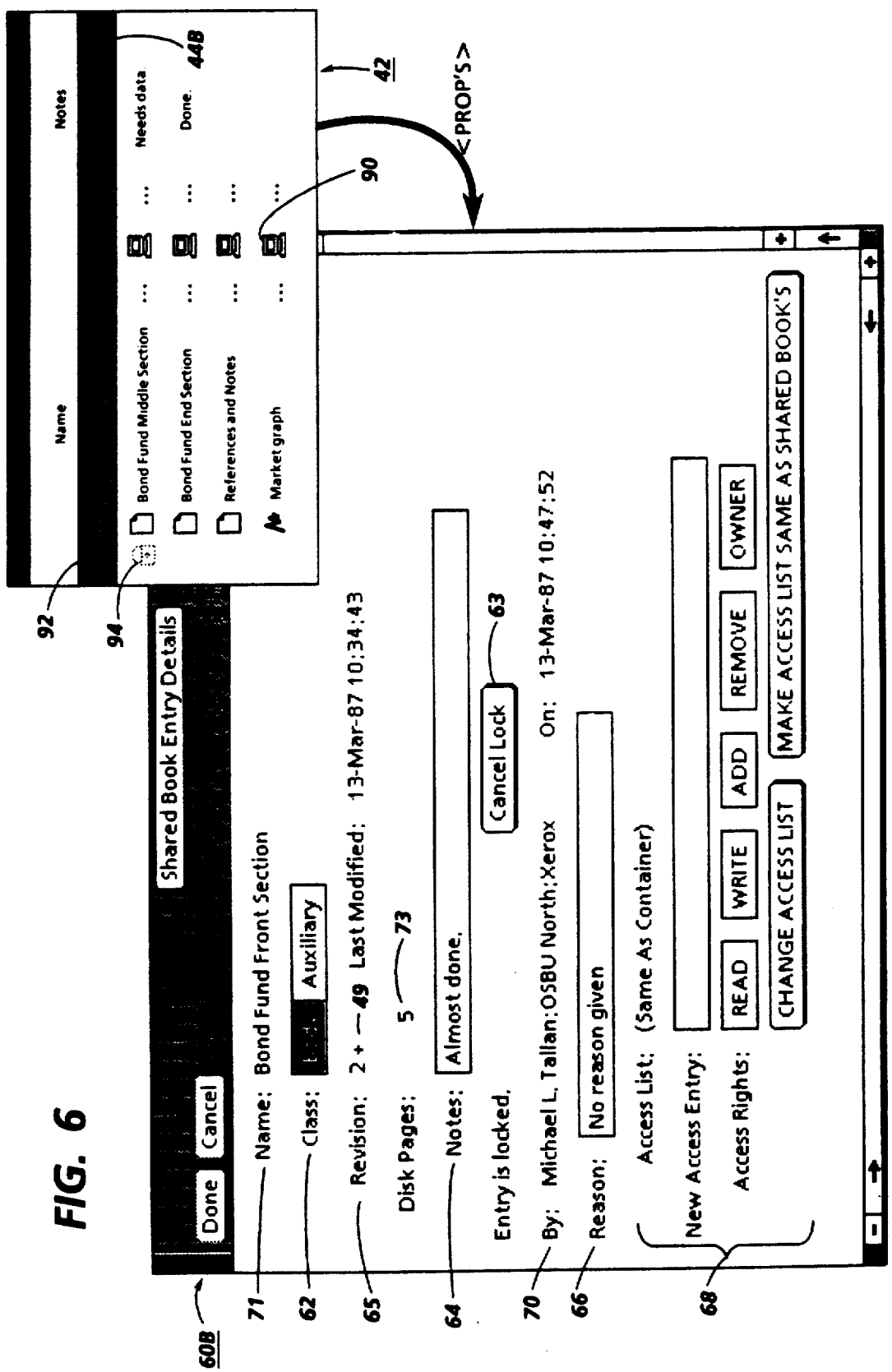
FIG. 6 illustrates a details options sheet for a locked entry in which a locking user views in the shared structured data object window shown in FIG. 2 as may be viewed on a workstation display shown in FIG. 1.

Shared books 40 have two different kinds of property sheets: (1) Shared book property sheet 50 is shown in FIGS. 3 and 4. This property sheet provides access to parameters or attributes of shared book 40. (2) Entry Details property sheet 60 is shown in FIGS. 5 and 6. This property sheet provides access to parameters or attributes of an individual entry 44, e.g., the entry's access list, whether the entry is locked, identity of who last locked it, when the entry was locked and why the entry was locked, i.e., an explanation to other users what the user is currently doing with the entry. Each entry 44 within shared book 40 has a Details property sheet 60 associated with it. Property sheets 60 are distinct from any application-specific property sheets for files stored in shared books 40. The shared book property sheet 50 has two different versions, depending on whether the shared book is a prototype 40' or an instance of a real, remote shared book 40.

For the most part, shared book window 42 displays most of the information about each entry 44. Entry Details property sheet 60 displays more infrequently needed information about an entry, e.g., an entry's access controls at field 68.

The blank Shared Book property sheet 50A, shown in FIG. 3, is obtained by the user selecting a prototype shared book from the prototype directory and copying it to the desktop and, thereafter, selecting and invoking the <PROP'S> command on a the copied prototype shared book. The name field 51, notes field 52, database field 53, and remote location field 54 are editable. Sheet 50A also includes fields for indicating the number of entries contained in a shared book at 59A, the total number of disk pages of the shared book at 59B and the total number of actual pages at 59'. Property sheet 50A enables the user to create new shared books and new instances of already existing remote shared books by filling in these fields with field data of an existing shared book, assuming such a user has appropriate access rights.

Figure 9:
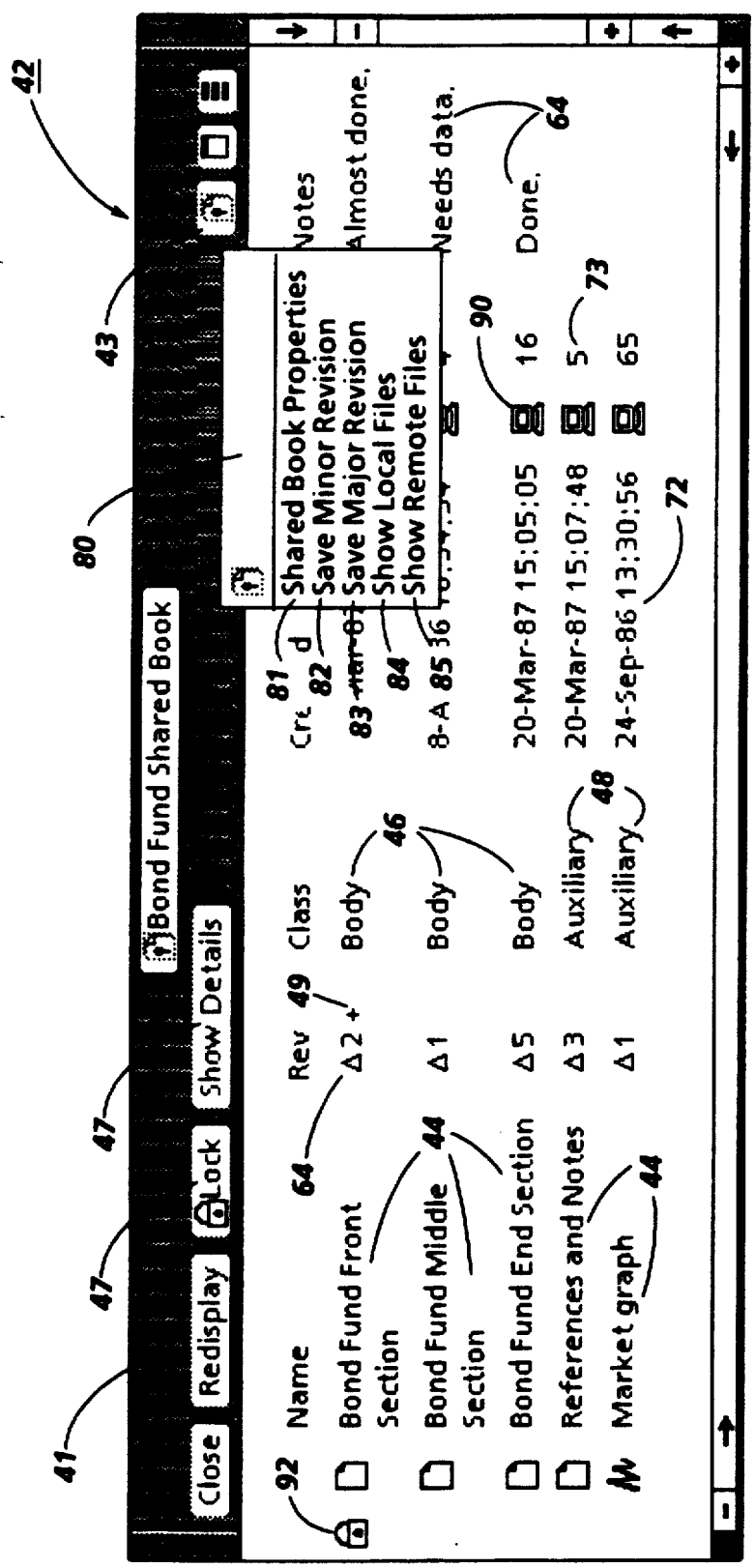
FIG. 9 illustrates the open window of the structured data object shown in FIG. 2 displaying an auxiliary menu having been previously opened.

Shared book property sheet 50B, shown in FIG. 4, is obtained when a user selects shared book 40 and either invokes the <PROP'S> command, as previously mentioned, or selects the "Shared Book Properties" command 81 in shared book auxiliary menu 80 shown in FIG. 9. Menu 80 is revealed by the selection of command symbol 43 in header 41 of open shared book window 42, as seen in FIG. 9.

Shared book property sheet 50B contains fields for those items that concern the shared book as a whole. As previously indicated, these, for example, include the shared book's name, its file service, its database, its access list, the number of remote consecutive versions of each shared book entry to be maintained on file service 16 and shared book notes. The access list field 56 is the list of individuals or groups of individuals who may access entries 44 in the shared book 40. The number of remote versions to keep field 55 allows the user to keep previous versions of an edited entry on remote server 16. The notes field 52 may be used to keep a brief comment about the project contained in shared book 40.

Three items in shared book property sheet 50B shown in FIG. 4 can be edited by any user, provided that the user has the proper access rights to the shared book. The editable items are the notes field 52, the maintained number of remote versions field 55, and the access list field 56. Editable fields are indicated in property sheet 50B by having outlined boxes around the fields. These items can be edited whenever property sheet 50B is opened. If shared book 40 is locked, property sheet 50B cannot be opened. Shared book 40 is not locked while property sheet 50B is open. It is possible that an operation initiated by another user could cause shared book 40 to be locked at the same moment that the first user, having made some changes to property sheet 50B, invokes the command symbol "Done" at 58 in property sheet header 57. In this case, the first user will receive a message on desktop 32 that the attempted changes to sheet 50B will be aborted and, in any case, property sheet 50B will remain in its open state. The first user may may close property sheet 50B and try again later.

Entry Details property sheet 60 shown in FIGS. 5 and 6 is obtained when a user selects a shared book entry, as indicated at 44A in FIGS. 5 and 6, and invokes the "Show Details" command symbol 45 in header 41 of shared book window 42, shown in FIG. 2. There are two different versions of property sheet 60 depending on the locking state of an entry 44 at the time of invoking this command. All versions of entry Details sheet 60 contain fields for the entry's name at 71, class at 62, revision level at 65 and last modification date at 65B, size at 73, identity of locking user 70 and time of entry lock at 72 (if not locked, identity of who locked it last and when that occurred at 65A, in FIG. 5), notes at 64, reasons for locking the entry at 66 and access list at 68. The field information is employed by users to build on their own procedures for tracking the current state of a publication.

The Notes field 64 and Reason field 66 provide additional basic job management support, such as, for example, respectively for procedural and annotative information. Procedural information refers to messages about the production process while annotative information refers to messages about the content of the publication. The fields relating to access lists and user identities may be employed to support the different roles of users. A user may have several user identities, each with different access rights to shared book 40. For example, one identity, "production editor", may be able to change the shared book access list, while another identity, "author", is able to edit the shared book entries, and a third identity, "reader", may only read entries. Access is discussed in further detail later relative to the Section, "P. Access Rights To Shared Books".

FIG. 5 shows property sheet 60A for an unlocked entry 44A, which has been selected, as indicated by the highlighted strip at entry 44A in window 42, and invoked via the "Show Details" command 45 (FIG. 2) to reveal the sheet's window and content. This version of the sheet contains a Lock command symbol 61, which, when selected by the user, locks the access of this entry 44A exclusively to the invoking user. This result can also be obtained via shared book window header 41 by first selecting the entry to be locked via mouse 30 and then invoking the lock command 47 in header 41 in window 42 via mouse 30. All other fields in this unlocked entry property sheet 60A are read-only.

FIG. 6 shows property sheet 60B for a locked entry 44B, which has been selected, as indicated by the highlighted strip at entry 44B in window 42, and the "Show Details" command 45 invoked to reveal the sheet's window and content. To be noted is that the originally invoked "Lock" command 61 has been replaced by a "Cancel Lock" command 63. In this state, class field 62, notes field 64, reason field 66, and access list field 68 may all be edited by the user. This editable state is indicated by the outlined boxes around these fields. Property sheet 60B for entry 44B locked by a user and appearing on another user's workstation 14 will be similar to property sheet 60A in FIG. 5, except that neither the "Lock" command 61 nor the "Cancel Lock" command 63 are present for this entry property sheet since entry 44B is locked by the first user. An important feature of this invention and for this other user is that the name of the user who has entry 44B locked is listed in field 70. Also, all fields for these other users are read-only.

If the user selects an entry 44 and invokes the <PROP'S> command from keyboard 25, then a message appears at desktop 32 indicating that the property sheet of the selected entry is not available. The user may obtain an Entry Detail property sheet 60 by selecting the "Show Details" command 45 in header 41 of window 42. It should be noted that if the user has not made an entry selection, the invoking of the "Show Details" command 45 will yield an error message on desktop 32, "Please select an entry." If more than one entry 44 has been selected in shared book 40, then an error message on desktop 32, "Details may be shown for only one entry at a time." will appear. In both of these cases the attempted operation will terminate.

If the user's instance of shared book 40 is out-of-date while the shared book window 42 is open, then none of the property sheets 60 for any entry 44 can be opened. The first attempt to do so will cause shared book 40 to be updated over network 12 via its designated file service, such as file server 16. This is another key feature for insuring users will work with an up-to-date local instance of a shared book 40. The user may then reselect an entry 44 and invoke "Show Details" command 45 again and property sheet 60 will appear.

It should be importantly noted that neither shared book property sheet 50 nor entry Details property sheet 60 lock shared book 40 while either such property sheet is in its open state. It is, therefore, possible for another user to change or modify shared book 40 or a selected entry 44 while either such property sheet is in its open state. If this happens, changes that the user has made to the property sheet will be ignored and a message will be posted at desktop 32 informing the user that shared book 40 has been updated and the user should try to invoke the same operation again.

C. Shared Book Implementation.

Reference is now made to the implementation of shared book relative to functional operation on workstation 14 in relation to the remote file services which provide a simple database for the records comprising the shared book and each of its entries and storage of entry content. In essence, the implementation is a control system for managing consistent versions of files, the provision for a brief, visual representation of the current status of the shared book properties, the list of entries and the entry properties, and sharing time among multiusers without the possibility arising that two or more users might be enabled to currently modify the same file or entry. The consistency is achieved through the display of a user interface representation among multiusers, which representation is rendered current to users who take a predetermined course of action, i.e., invoke a functional operation, relative to the shared book implementation. Consistency is paramount so that when a predetermined shared book operation or function is invoked the implementation will check the database file of records to determine if the current status of the shared book or any of its entries has changed, and, if so, update the user interface representation thereof.

As previously indicated, the implementation is a decentralized client-based system, i.e. is operational from workstation 14 and not a remote file service, so that it is not necessary to provide a remote service that contains information about the number of versions out on the network, or the workstation location of existing versions, or whether existing versions are current or old, or whether or not existing versions should be updated. In other words, the status information displayed in representation 40 is kept current in a relaxed WYSIWIS fashion. The invoking of a functional operation, such as a change or modification to an entry at a workstation 14 or the addition of a new entry to shared book 40, is not monitored on network 12 and thereafter immediately broadcast to other users such a change in status due to such an operation, as in the case of a strict WYSIWIS user interface. Rather, status information relative to shared book 40 is demand updated, i.e. retrieved by the client-based implementation. The representation of that information is updated only when a rightful user having the same shared book and its representation invokes an operation relative to shared book 40. Thus, there is no danger of invoking an operation relative to out-of-date shared book structured data objects since the implementation ensures that an invoking user has current information before permitting an operation, dependent upon the currency of such information, to proceed. While the concept of consistency through read/write transactions in a client-based system is not new, e.g., Paxton, supra, the concept of providing such consistency continuously relative to predetermined operations performed at the client workstation relative to a structured data object while locking out other transaction attempts during consistency updating is an important aspect of this invention. With the foregoing in mind, reference is made to the flowcharts of FIGS. 13-15 to further explain these as well as other attributes relating to the user interface representation of current information and status about a structured data object, such as a shared book, to multiple users and sharing consistent versions of related structured data objects, e.g. entries, contained in such a structured data object.

Figure 13:
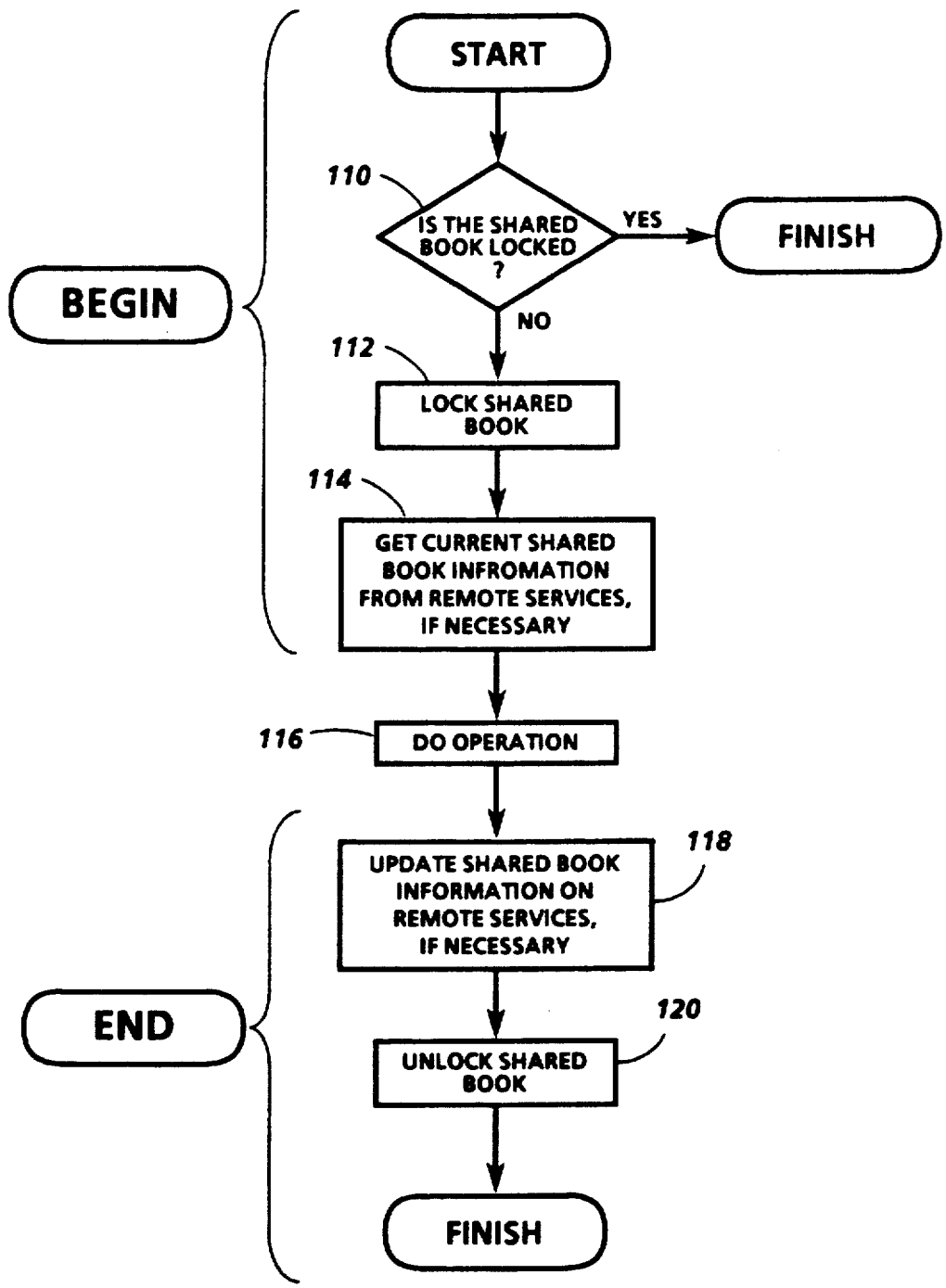
FIG. 13 is a flowchart representation of a basic algorithmic procedure performed by the implementation of this invention.

In FIG. 13 there is shown a flowchart which represents the basic transaction occurring during each instance of a shared book operation, i.e. upon user invoked operational commands on shared book 40, wherein such an operation has a requirement or need for current shared book information to properly implement the operation. The transaction of FIG. 13 is carried out to completion from START to FINISH with performance of the invoked "Do Operation" at 116. The transaction of FIG. 13 can be divided, for convenience, into a BEGIN portion and an END portion. The BEGIN portion updates the local copy of shared book information, if necessary. The END portion updates the remote instance of a shared book data file, if necessary, by copying data from workstation 14 to the remote files services. Encompassing these updating functions is the locking and unlocking of the shared book's lock. The BEGIN portion is represented by functions 110, 112 and 114 and the END portion is represented by the functions 118 and 120. In this connection, the implementation for shared books provides arbitration of access to the remote shared book data by using a lock on the shared book. The lock is implemented by the database service and is available over the network. In this manner, any user invoked operation that requires up-to-date shared book data, or could possibly effect data changes, such as opening a shared book 40, opening an entry 44, opening the shared book property sheet 50 or opening an Entry Details property sheet 60, locking a particular entry 44, copying a shared book entry 44 to desktop 32 or copying an entry from desktop 32 back into shared book 40, causes the implementation to acquire or attempt to acquire a lock on the shared book. If successful, the command is allowed to proceed and the lock is held on the shared book for the duration of the execution of the command, after which the shared book lock is released. Otherwise, the user is informed that the shared book is currently in use and displays the name of the other user that presently has the shared book locked.

Locks are specified for the shared book per se or for an entry or entries. The former control is invisible to the user and the latter control is invoked by the user and is visible to all users in their user interface representation. The former provides for consistent and continuous serialized updating of the shared book representation while the latter gives a user exclusive right over an entry, usually for the purpose of entry modification. It should be realized that the shared book is locked only during execution of an operation command and the lock, therefore, is usually "short living", i.e. milliseconds or seconds or minutes, whereas entry locking occurs manually by a user and will remain indefinitely or at least until invoking of a "Save" command on an entry or explicitly cancelling the lock and, therefore, is "long living", i.e. minutes, days or even weeks. The purpose of the shared book lock is to maintain consistency in updating information in the relaxed WYSIWIS representation about a shared book without processing further updating information from another shared book implementation so that updates to a shared book's data file are serialized by transparently acquiring its lock. Once the lock is released, another user instance is free to acquire the shared book lock via the next user invoked operation command.

Upon a user invoked operation command, the implementation will conduct a transaction with the remote database service to determine if the shared book is locked, as indicated at decision box 110. If the shared book data file is locked, the task is finished, i.e. aborted, and the user is encouraged to try again. If the shared book data file is not locked, then the shared book is locked, as indicated by box 112. Next, the current shared book information is obtained from the shared book data file, if necessary, i.e. the information, as updated, pertaining to the current list of entries of the shared book and the fields of records pertaining to shared book window 42, the shared book property sheet 50B and each shared book entry property sheet 60B. This function is represented by box 114 in FIG. 13. After information updating of the local instance of the shared book user interface representation, the task originally invoked by the user is processed, as represented by the "Do Operation" of box 116. This task, that will invoke the transaction of FIG. 13, will be an operation at the entry level, such as, opening an entry, copying an entry, opening an entry Details property sheet 60B, locking an entry, paginating one or more entries or printing one or more entries, on the shared book. There are also some operations relative to the shared book entity per se, such as, opening of a shared book icon 40, opening the shared book property sheet 50B, copying an entry into or out of the shared book, or paginating the shared book or copying the shared book to the printer icon, that will invoke the transaction of FIG. 13.

The next function to occur in the transaction of FIG. 13 is an updating of shared book information, relative to the local instance, to the remote file service, i.e. to the remote shared book data and database files. This is represented by box 118 in FIG. 13. Thus, any local changes to information relating to the shared book 40, for example, addition of a new entry 44C to a local instance of shared book 40 or invoking a "save" command on an entry 44, will be updated to the remote shared book, after which the shared book lock is removed, as indicated at box 120. The transaction is thus completed or FINISH.

Figure 14:
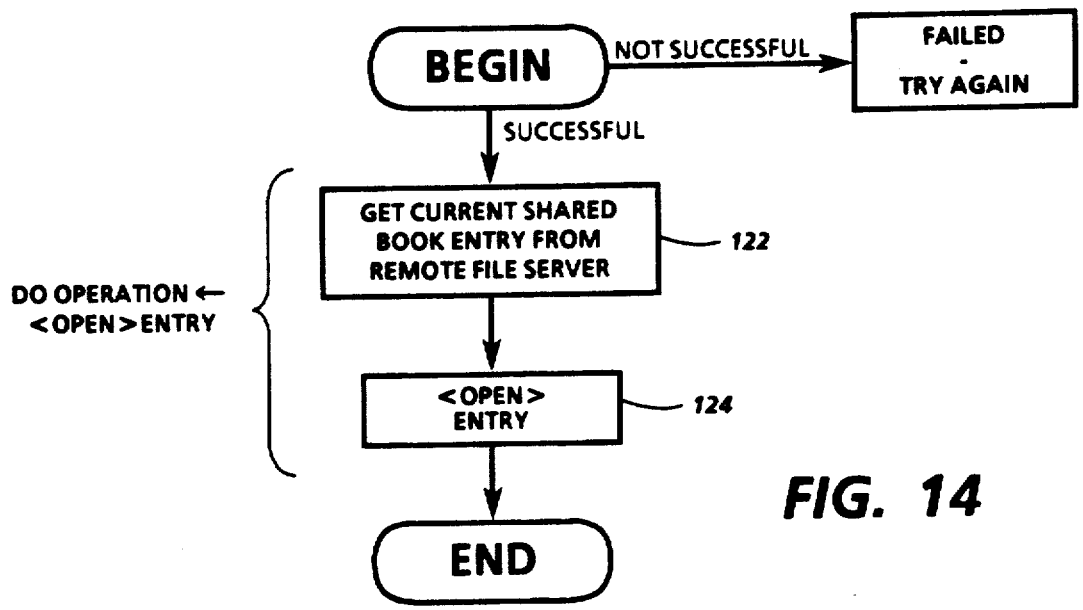
FIGS. 14 and 15 are flowchart examples of other algorithmic procedures performed by the implementation of this invention.
Figure 15:
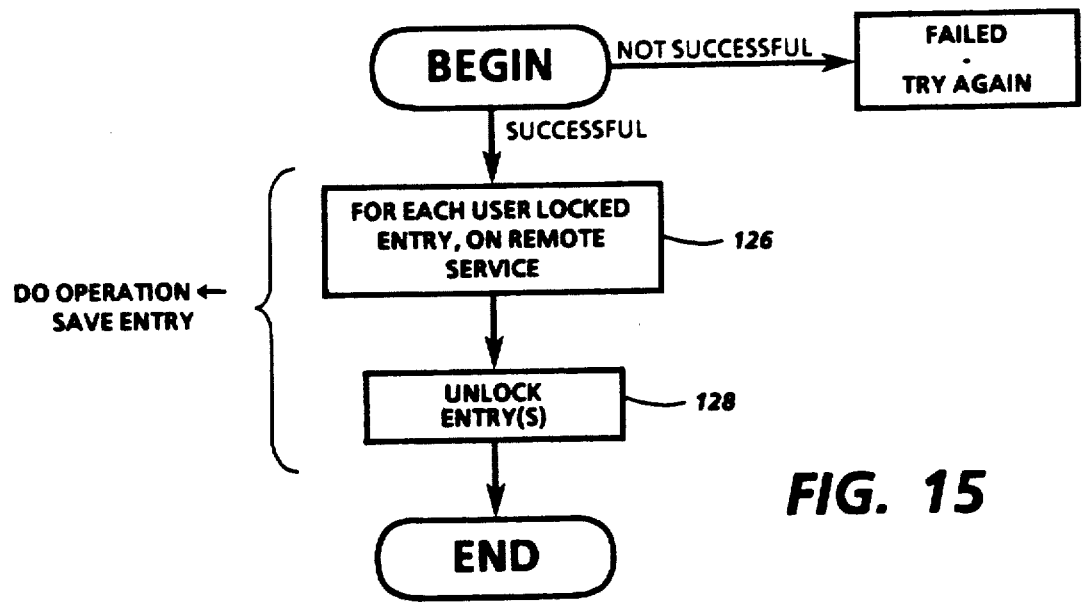

Examples of user invoked operations are shown in FIG. 14 and 15 relative to an already selected entry 44A. FIG. 14 represents the entry level operation for opening an entry 44, via the <OPEN> command, while FIG. 15 represents the entry level operation for saving an entry, which is discussed in more detail hereinafter in "Section I, Saving An Entry Or Entries In a Shared Book". In FIG. 14, if a user has opened shared book window 42 and selects an entry and thereafter invokes an <OPEN> command from keyboard 25, the BEGIN portion of transaction of FIG. 13 is initiated, determining the locking state of the shared book data file at 110 and, upon obtaining that lock at 112, updating the local instance of its representation at 114.

At this point, the "Do Operation" 116 is performed, which, in the case here, is the opening of an entry 44. Some operations, such as, opening an entry, copying an entry out from shared book 40 onto desktop 32 entry details, ensure the user has made a correct selection by aborting at this stage if the local shared book data was indeed updated at box 114. If at box 114 new data was not actually retrieved because there was no new data to report, these particular operations proceed as invoked. A check is made to determine if a local cache of the entry exists and, if not, the current version of the entry is obtained from the remote file service. On the other hand, if a copy of the entry exists at the local instance of the shared book, then a check is made to determine if the local instance is up-to-date, i.e., if the version at the remote file service has a later creation date than the locally cached version. If true, then the implementation will have the copy of the more recent version on the remote file service replace the local copy of the entry. This functioning is indicated by box 122 in FIG. 14. Next, the up-to-date entry is opened, which is represented by box 124 in FIG. 14. The "Do Operation" 116, having been completed, the END portion of the transaction of FIG. 13 is completed with updating of the remote instance of the shared book representation, if necessary, at 118 and the unlocking of the shared book 40 data file of the representation at 120.

It is of side interest relative to this Open Entry example of FIG. 14 to note that if the user had not previously invoked a Lock Entry operation, the above opened view of the entry in some cases would be a read-only version, i.e. not editable.

In FIG. 15, if a user had locked and/or edited one or more entries of the shared book and desires to update the remote instance of the entry or entries 44, the user may invoke a "Save" command from header 41 of shared book window 42, as will be explained in greater detail later. This action invokes the BEGIN portion of transaction of FIG. 13 and a determination of the locking state of the shared book at 110, followed by the successful seizure of the lock at 112 and the updating of the local copy of its representation at 114, if necessary. If seizure of the lock is not successful, the user is told to try again. At this point, the "Do Operation" 116 is performed, which, in the case here, is the saving of entry(s) 44. For each entry that has been locked by the user, the entry is copied to the remote file service providing an up-to-date remote copy of the entry(s) 44. This function is represented by box 126 in FIG. 15. After "Save" function is performed, the saved entry or entries are automatically unlocked by the implementation because an entry "Save" operation connotes the completion of the task of entry modification. This is represented by box 128 in FIG. 15. The "Do Operation" 116, having been completed, the END portion of the transaction of FIG. 13 is completed with updating of the remote instance of the shared book representation, if necessary, at 118 and the unlocking of the shared book data file of the representation at 120.

It is of side interest relative to this Save Entry example of FIG. 15 to note that if the user had not previously invoked a Lock Entry operation, the entry or entries would not be saved by copy to the remote file service. Again, to maintain consistency of the current state of the shared book, the shared book cannot be undergoing changes or updating by another user concurrently with the attempted "Save" operation by the instant user and represent a current state of a shared structured data object viewed by multiple users at different workstations.

An important point represented by these two examples is that a shared books data file and records are locked so that no other user can change the status of the shared book while the locking user is changing its status or the status of one or more entries, such as, by updating via the "Save" command.

One point that warrants reiteration is that the transaction of FIG. 13 performed on shared book data file occurs repeatedly with a series of user invoked operations, i.e. for each user invoked operation logically requiring shared book information to be updated for its proper implementation. An example of this is a serial chain of user invoked commands of (1) Open Shared Book, (2) Lock Entry, (3) Open Entry, (4) Close Entry, (5) Save (Auto Unlock) Entry, and (6) Close Shared Book. There is, here, a series of six commands. Between the third and fourth command, an entry in shared book 40 may be edited. Of these six commands, the fourth and sixth commands of entry and shared book closure from the representation header 57 are not operations requiring updating of shared book information. However, the other four commands of, opening a shared book and an entry, locking an entry and saving an entry, are operations requiring updating of shared book information so that the users of local copies of this information via the shared book user interface representation, is consistent with the current state of user's activities relative to the entire shared book. In connection with the invoking of each of these four consecutive commands, the transaction of FIG. 13 will also be invoked four consecutive times, before actual command execution in order to check the current status of shared book information and update the local instance of the shared book representation, if necessary, and then after command execution, update, if necessary, the remote copy of the shared book representation. During the occurrence of each of these four executed transactions, vis-a-vis between transactions, access to the shared book by other users is denied.

D. Creating A New Shared Book.

A user can create a new shared book 40 by filling in the fields 51-54 of a Blank Shared Book's property sheet 50A, shown in FIG. 3. Of the four editable fields, only the notes field 52 is optional. The other three fields 51, 53 and 54 must have valid entries. There is an approximately 100 character limit designated for the length of the name for a shared book.

The database field 53 can be set from an entry in the user profile that exists on the user's workstation 14, i.e., the workstation network communication profile contains a default database service. A sample entry might look as follows:

DataBase: Book: AlphaServices-PA:Xerox

In the above example, with reference to FIG. 4, the database source is "Book" having a domain of Alpha Services-PA of the organization, Xerox. The user is free to change this preset value in a blank shared book property sheet to something different if the user so desires. However, a fully qualified name of the database file should be used.

Remote location field 54 has a rigidly defined format, as follows:

(ServerName:Domain:Organization)FileDrawer/-Folder

In the example above, with reference to FIG. 4, the server name is "Spinner" having a domain at the Northern "Office Systems Business Unit" (OSBU) in the organization, Xerox in a file drawer called "LDS", which designation may mean "Long Document Service", in a folder created for the shared book file called "Doc", which designation may mean "documents". No other delimiters, such as square brackets or angle brackets, are permitted. A pathname consisting of several levels of file folders, each of which is contained in the folder above it, is permitted, as long as the folder names are separated by slashes ("/"). The fully qualified name of the remote file server, i.e., the domain and organization must be used. All of the above is conventional file and database designation and is well known file service representation in the art. The database service and the remote location of the real shared book may be on the same or different file services.

Continuing with FIG. 3, when the user has filled in fields 51-54 and has invoked the "Done" command 58, the user is asked to confirm the operation. After receiving the confirmation, usually a response "Yes", to an inquiry presented on workstation 14, shared book 40 is created in the specified folder in the designated remote file drawer with a record for the shared book in the designated database, and the previously Blank Shared Book prototype 40' is converted into a local instance of the new remote real shared book 40. If the user entered the name of a folder that doesn't already exist in the remote location field, a new folder will be created and the new shared book will be placed in the folder. The initial access list for a newly created shared book 40 is automatically set to that of the folder in which it is placed or a default access list. If the folder is also newly created, then both shared book 40 and the folder will have the same access list as the container in which the folder has been placed. Also, new shared book 40 will be given the initial revision number 1.0 in property sheet field 59.

Once the new shared book has been created, its database and remote location are fixed. When property sheet 50B of new shared book 40 is opened, such as that illustrated in FIG. 4, these two particular fields are read-only fields. If the user desires to move shared book 40 to a different remote location or database service, then a new shared book must be created.

The shared book's database record is used by the application to prevent different users having access rights from changing shared book 40 at the same time. Each transaction that involves any shared book data first attempts to lock the shared book's record. If the record is already locked, a message is posted at desktop 32 that gives the name of the user who has the shared book record locked and the length of time for which shared book 40 has been locked. A very long time, e.g., several hours or more, is suspect, and might indicate that the user who locked the shared book crashed in the middle of an operation, leaving the record locked.

E. Obtaining An Instance Of An Existing Shared Book.

Typically a shared book will be used by several users who are working together on a single project, such as a publication. Shared book 40 and its entries 44 are stored on a file service so that they are accessible to all users of the shared book. All users may have a local instance of shared book 40 on their desktop 32. In this sense, the shared book 40 is similar to a VP reference folder, previously explained in the Background.

There are two ways for a user to obtain an instance of an existing shared book 40:

1) The user may take a Blank Shared Book prototype 40' and edit its property sheet 50A, shown in FIG. 3, to point to the real, remote shared book 40 on a designated file service. In this case, only the name and remote location fields 51 and 54 need be filled in in sheet 50A. It is not necessary to supply the database pointer. Any entry in the notes field 52 will be overwritten by the notes in remote shared book 40 when retrieved. After the user invokes the "Done" command 58, a confirmation message will appear on the user's desktop 32, to which the user must invoke an answer, "Yes", in order for the operation to proceed further. The confirmation message provides a distinction between an instance of an existing shared book and the creation of a new shared book.

This method will create a listing of the entries in the shared book, but will not actually copy the files themselves to the user's workstation. This allows the user to conserve local disk space on the user's desktop 32 by only retrieving those entries which are actually needed by the user.

It should be noted that the user must have at least Read access rights to shared book 40. If the user does not have sufficient access rights, then an error message is posted and the retrieve operation for shared book 40 will terminate.

2) The user may initially determine the remote location of shared book 40 and retrieve a copy, via the <COPY> command from keyboard 25, of shared book 40 to the user's desktop 32. This method will retrieve copies of all the individual entries 44 to the user's workstation 14. A drawback in employing this approach is that all allowable versions of each entry 44 that were stored in the remote shared book will also be copied. If the shared book is large, the user must make sure that there is sufficient local disk space on the user's workstation 14 to accommodate this function. Undesired versions may be deleted from shared book 40 by invoking the <DELETE> command from shared book local file 100, which is explained in more detail later.

It should be noted that local copies of entries 44 will not keep the same version numbers as their real, remote counterparts. Instead, they will be renumbered starting with 1. If multiple versions of an entry 44 are copied to the workstation, they will be given successive numbers starting with 1, with the most recent version having the highest number.

F. Adding A New Entry To The Shared Book.

Figure 7:
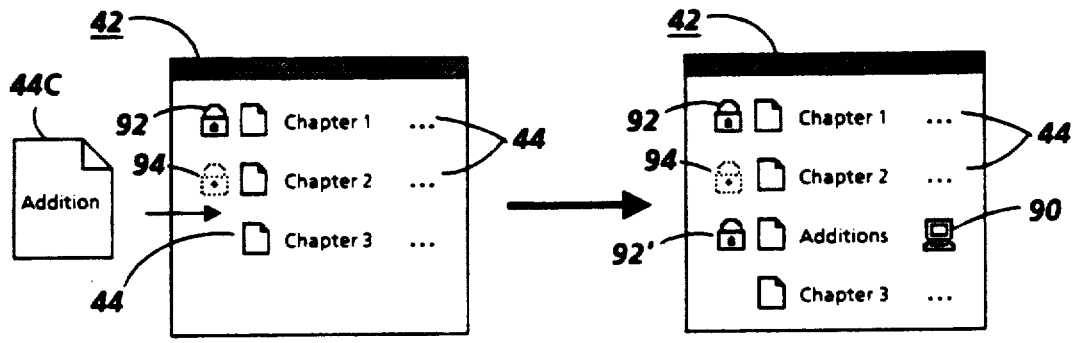
FIG. 7 illustrates a simplified version of a shared structured data object window for the purpose of illustrating how additions may be made to a shared structured data object.

Reference is now made to FIG. 7 to explain the procedure used for the user to add additional entries 44C to shared book 40. The user selects a file 44C on desktop 32 which contains the material to be added to book 40.

In the illustration in FIG. 7, the user selects a document 44C, "Addition", on desktop 32 and moves it, invoking either the <MOVE> or <COPY> command from keyboard 25, and then selects inside shared book window 42 the entry point between the Chapter 2 and Chapter 3 entries 44 in shared book 40. New entry 44C will be inserted at this designated point and is registered with the database service to have its own entry record, and, further, is copied to the real, remote shared book at the remote file service. A small workstation icon 90 will appear next to new shared book entry 44C indicating to the user that a local copy of this entry is on user's desktop 32. This is a hint to users viewing the window representation that operations involving the entry, e.g., <OPEN> command, will proceed more quickly because the entry 44C is also local on desktop 32. As shown in window 42 in FIG. 2, small workstation icon 90 appears next to all entries 44, whenever such a local copy exists.

New entry 44C is also initially locked upon insertion into book 40, as indicated by lock symbol or icon 92' next to entry 44C in FIG. 7. If the user does not intend to make any changes or modifications to new entry 44C, then lock 92' should be released. To do this, the user can either select "Save Minor Revision" command 82 in menu 80 (FIG. 9) or the user may open the entry's Details property sheet 60B (FIG. 6) and invoke the "Cancel Lock" command 63.

It is to be noted that new entries 44C can only be added to an open shared book 40. The user is not permitted to <COPY> a file onto a closed shared book icon 40. In this manner, it is known the exact ordering that additional entry 44C is to take among the other entries 44 of shared book 40.

For Body entries 46, a user should add the new material at the location in the order in which the material belongs in the shared book publication material. This order is used to determine the sequence of page numbers assigned to consecutive entries as part of the pagination process. However, the order of entries 44 can be changed at any time. The user merely selects the entry(s) 44 in shared book window 42, invokes the <MOVE> command, and selects the destination point within the "Name" column of shared book 40 between or after other entries. The real, remote shared book 40 on the remote file service will also be updated. There are two limitations. First, multiple entries cannot be moved as a group to the end of shared book 40. Second, an entry 44 that is already locked by one user cannot be moved by another user until that entry is unlocked by the first user.

The default class for entries 44 added to shared book 40 is "Body" class 46. Users must employ the entry Details property sheet 60B for entry 44C if they want to classify a newly added entry as "Auxiliary".

If selected and added entry 44C has the same file name as an entry already present in shared book 40, then whether or not entry 44C becomes stored depends on whether the user has the original in-the-book entry of the same name already locked. If the original in-the-book entry isn't locked by the user, then the user will receive an error message at desktop 32 and the operation will terminate. If the original in-the-book entry is locked, then this original entry will be replaced by new entry 44C upon insertion into shared book 40. The replacement of an entry will occur even if new entry 44C is of a different file type. The entry's revision number will be updated when new entry 44C is saved. The entry's class field 62 and notes field 64 will not be affected by this change.

In the user's local instance of shared book 40, the entry list in shared book window 42 will reflect the new entry. While the original entry with the same name is deleted from the local instance, it is not deleted from the real, remote shared book, provided that the Versions To Keep option field 55 in shared book property sheet 50B is set to 2 or more versions. Opening the folder 102 of remote files, shown in FIG. 12 and to be discussed in more detail later, will reveal that both the original and new entries are present. The original entry can be copied to desktop 32 from folder 102. This allows the user an option to back out of changes that possibly turn out to be undesirable.

It should be noted that a shared book 40 does have a finite size. Users cannot keep adding entries ad infinitum. There are two limits. The first limit is the amount of available space on the remote file server where the shared book is maintained. When the file server is full, no further entries can be added to shared book 40. The second limit is the amount of space shared book 40 has available to hold information about its entries. Long entry names, and large access lists will take up available space. This limit is independent of the size of the entries themselves. The amount of space currently used by shared book 40 is shown in shared book property sheet 50B, as indicated in FIG. 4 in field 59' labelled, "Shared Book Pages". A shared book 40 may have, for example, 128 disk pages available for use. The user should split a shared book into two or more smaller shared books before such a limit is reached.

G. Locking An Entry Or Entries In A Shared Book.

Locking an entry 44A ensures that no other user will be able to concurrently modify the locked entry. The user locks an entry 44 by invoking the "Lock" command 47 in the shared book header 41, shown in FIG. 2, or the "Lock" command 61 in the entry's Details property sheet 60A, shown in FIG. 5. The instance of a locked entry 44 by the user is indicated by the lock icon 92 present in the left end column of shared book window 42, such as shown in FIGS. 2 and 8. Using the shared book header "Lock" command 47 is an "accelerator", i.e., it is quicker to select an entry 44 and invoke "Lock" command 47 than it is to initially open entry Details property sheet 60A. Also, the header "Lock" command 47 enables the user to lock multiple entries 44 at the same time. However, the user is not able to modify the entry's notes field 64 or reason field 66 when using the shared book header command method, although these fields may obviously be edited later by invoking property sheet 60B. If the entry Details "Lock" command 61 is used, then the user may supply a reason and notes after an entry 44A is locked. This same information will be displayed to other users of shared book 40 when those users open a Details property sheet 60A pertaining to that particular entry 44A. After entry 44A is locked, the user may <OPEN> the entry and edit its file.

As previously mentioned, more than one entry can be selected at one time and locked. However, if it happens that no entries are selected, invoking "Lock" command 47 or 61 will yield an error message, "Please select an entry" and the operation will terminate. Should more than one user attempt to lock an entry simultaneously, one user will obtain control of the selected entry, and the other users will be told that it is already locked.

If another user has previously changed the real, remote shared book 40, such as by changing an entry 44 or in some way altering shared book 40, then a present user's instance of that shared book 40 is not up-to-date. In this case, the "Lock" command 47 or 61 will not initially function. Instead, shared book 40 will be first updated and the originally intended "Lock" selection loss. This automatic selection lost is true for all shared book commands. After the local instance of the user's shared book 40 has been updated, the user can then reselect the desired entry 44 and again seek to invoke the "Lock" command 47 or 61.

Figure 8A:
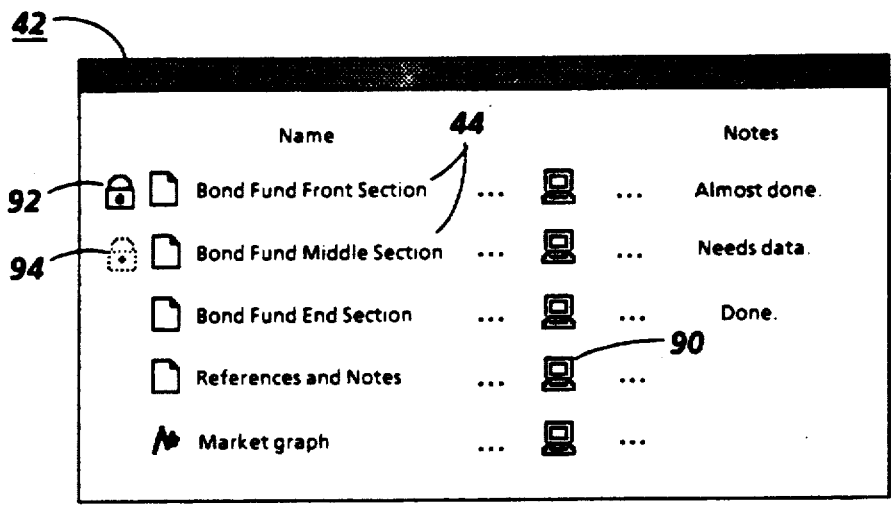
FIGS. 8A and 8B illustrate a simplified version of a shared structured data object window for the purpose of illustrating the locking of an entry in a shared structured data object.
Figure 8B:
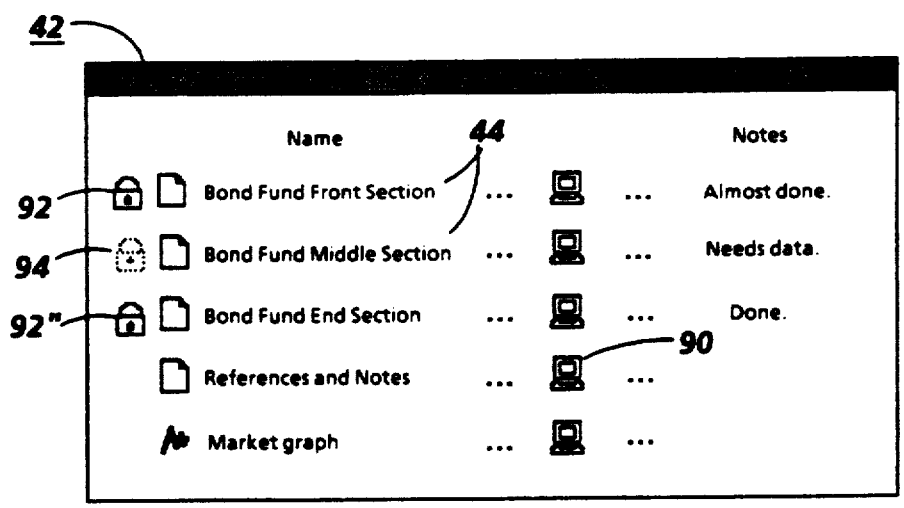

Shared book window 42 indicates which entries 44 are not locked, which are locked by others, and which ones the user has locked unto himself or herself. In this connection, see, as an example, FIGS. 2, 8A and 8B. The absence of a lock icon 92 or 94 in front of the entry indicates no one has locked this particular entry. The presence of a light gray or halftone lock icon 94 in front of an entry 44 indicates another user has locked this particular entry. The presence of a heavy black lock icon 92 indicates that the user has locked this particular entry. The user can see who has a given entry locked by opening Details property sheet 60B of FIG. 4 for the particular entry containing a halftone lock icon 94 and viewing field 70. The transition from FIG. 8A to FIG. 8B illustrates the result that occurs when the user locks another entry, in this case the entry entitled, "Bond Fund End Section" which is now indicated locked by the user with the posted lock icon 92".

H. Editing Of Entries Within The Shared Book.

To edit an entry 44 within a shared book 40, the user opens shared book window 42 and selects a desired entry 44A. Entry 44A should then be locked as previously described. When the <OPEN> command is invoked on a selected and locked entry 44B, the view of entry 44B replaces the workspace of shared book window 42 or, alternatively, a new window 35B is created on desktop 32 within which entry 44B is viewed and edited. If entry 44B is a VP document and <OPEN> is invoked without having been locked, the standard edit command will be missing from the VP document header so that the entry will not be editable.

The user may also edit an entry 44 on desktop 32 outside of the shared book. The first step to accomplish this function is to <COPY> an entry 44 onto desktop 32. Note that the entry does not need to be locked in order to accomplish this function. Once on desktop 32, entry 44 can be edited like any normal VP document. The final step is to <COPY> edited entry 44 back into shared book 40. For this operation, the same named entry inside shared book 40 must be locked, as previously indicated. The original entry in book 40 will then be replaced by the updated entry on desktop 32, which is moved or copied into book 40. If the same named entry 44 in shared book 40 is not locked, then the user will receive on desktop 32 the message, "The entry already exists and is not locked by you!" and the operation will terminate.

Although it is permissible in this second method to wait until entry 44 is ready to be copied back into shared book 40 before locking it, it is not advisable. While the entry is unlocked, another user can lock the same entry in shared book 40 and perform editing functions on the entry. This could lead to complications when the first user copies an edited version back into shared book 40.

An entry 44 that has been edited but not yet saved will have a "+" sign 49 appended to the version number in shared book window 42. Sign 49 will appear when window 42 is redisplayed after entry editing. This is a visual indicator to the user that the local entry has a more recent date than its remote counterpart on the file service and that a "Save" operation should be accomplished at some time.

Note that an entry 44 may not, under some circumstances, be able to be opened. This will happen if the database record is unavailable. Another case is if the local instance of an entry 44 is not the most recent but there is insufficient disk space on the user's workstation to retrieve the latest version. For all of these cases, an error message is posted to desktop 32.

I. Saving An Entry Or Entries In A Shared Book.

Shared books 40 have two menu commands in menu 80 for saving entries: "Save Minor Revision" command 82 and "Save Major Revision" command 83 as shown in FIG. 9. The only difference between the operation of these two commands is the manner in which they update the shared book's revision number at field 59. The shared book's revision number at 59 is displayed in the shared book property sheet 50B and is maintained solely by the application.

It should be noted that shared book's revision number 59 is distinct from the revision number of an individual entry 44. The former represents the state of the publication that shared book 40 represents and can be employed to distinguish between minor and major revision levels. The entry's revision number, shown at field 63 in FIG. 60B, represents a particular instance of an entry 44B.

A shared book's revision number 59 is maintained in the form "m.n", where "m" is the major revision number and "n" is the minor revision number. "Save Major Revision" command 83 sets "m" and "n" using the rule:

$$m \leftarrow m+1$$
$$n \leftarrow 0 \quad (1)$$

"Save Minor Revision" command 82 sets "m" and "n" using the rule:

$$m \leftarrow m$$
$$n \leftarrow n+1 \quad (2)$$

The entry's revision number 63 is increased each time the user edits an entry and saves the entry. The entry's revision number 63 is the same as the entry's remote storage version number, which is maintained by the file service. The entry's revision number 63 is maintained by shared book 40. This means, for instance, that the entry's revision number 63 does not accompany an entry 44B copied from a local shared book 40 to desktop 32.

The revision number of an entry 44 contained in shared book 40 is maintained in the form "k", and is set by both the "Save Minor Revision" and "Save Major Revision" commands 82 and 83 according to the rule:

$$k \leftarrow k+1 \quad (3)$$

The above three rules, (1),(2) and (3), are applied only if entry(s) 44, being saved, have changed or have been modified after they were locked. The revision numbers 63 of entry(s) 44 and of shared book 40 are not updated if entry(s) 44 was not modified. Changes to property sheets 50 and 60 of shared book 40 and entries 44 will not by themselves cause the shared book's revision number to be updated. Deleting an entry will not change the shared book's revision number. Only a "Save" operation can update the shared book's revision number 59. As an example, there is currently the entry, "Bond Fund Front Section" locked, as shown in FIG. 2 by lock icon 92 to the left of this entry. The entry's revision number 63 is currently "2", as is evident from window 42 and the entry details for entry, "Bond Fund Front Section" in FIG. 6, and the shared book's revision number 59 is currently "1.7", as is evident from property sheet 50B in FIG. 4. The user selects this entry in shared book window 42 and invokes the "Save Minor Revision" command 82 from menu 80. This causes the shared book's revision number 59 to be increased to "1.8", and this particular entry revision number 63 to be increased to "3". Had there been a "Save Major Revision" command 83 invoked from menu 80 instead of a "Save Minor Revision" command 82, the entry's revision number 63 would still be set to "3". However, the shared book's version number 59 would be increased to "2.0".

Both of these "Save" commands operate in the same manner with respect to a particular entry selection. If there are no entries selected in the shared book, then all entries currently locked by the user will be saved. Entries that are not locked or that are locked by someone else are skipped. If one or more entries 44 have been selected by the user before invoking either "Save" command, then the application will first check that all entries in the selection are locked by the selecting user. If at least one entry in the selection is not locked by the user, then an error message is posted to desktop 32 and the operation terminates. If all entries in the selection are locked by the user, then these entries will be saved.

After locked entries have been saved, they will be automatically unlocked. If at least one entry was changed or modified while in its locked state, then the real, remote shared book 40 on the remote file service will be updated and its revision number 59 will be updated.

J. Deleting An Entry Or Entries Within A Shared Book.

Deleting an entry in shared book 40 requires the user to initially lock the entry. Once locked, the user may delete the entry in the shared book by selecting it and invoking the <DELETE> command from keyboard 25. A confirmation message, "Confirm to permanently delete items from shared book?" will appear at desktop 32, to which the user responds, "Yes", as is known in the VP software system. This causes the local copy of the entry, if any exist on user's desktop 32, to be deleted along with the copy or copies present on the remote file service; i.e. the entry is completely exhumed from shared book 40. Furthermore, the entry's record is deleted from the database service. This means the entry is deleted without trace from the shared book representation.

Other users of the shared book may still have a locally cached copy of the deleted entry in their particular instances of shared book 40. These local, distributed copies of a remotely deleted entry will not, therefore, be automatically deleted. Therefore, after deleting an entry, other users should be notified so that they can delete their locally cached copies of such an entry. Note that, in some cases, retaining a locally cached entry may be an advantage. If an entry has been deleted from its shared book erroneously, another user may still have a copy in their local instance of shared book 40. The deleted entry could then be copied back into the deleting user's local instance of shared book 40 thereby recreating the entry.

In most VP operations, the <MOVE> command from keyboard 25 will transfer a selected structured data object to a new destination while deleting it from the original location from where it was moved. A notable exception to this action is in the case of a <MOVE> command invoked on a document for transfer onto a printer icon for document printing. The <MOVE> command in this case will behave like a <COPY> command. In any case, the user can <MOVE> an entry 44 to a new location within shared book 40 and it will be deleted from its original position in the shared book. If a location outside of shared book 40 on desktop 25 is selected as the destination, then the <MOVE> command operates somewhat differently. In this case, the <MOVE> command behaves like the <COPY> command, as in the case of printing. Thus, the local instance and the real, remote version of the entry are not affected. Only invoking the <DELETE> command will permanently delete an entry.

K. Deleting A Shared Book.

There are two methods of shared book deletion: (1) deleting only shared book icon 40 from a user's desktop 32, and (2) deleting the real, remote shared book 40 from the remote file service.

Users will perform the first method when they want to simply delete their instance of shared book 40. It will not affect other users of the same shared book and the real, remote shared book 40 still exists on the remote file service. The deletion is performed by selecting shared book 40 on desktop 32 and invoking the <DELETE> command. This will delete the shared book container and all the entries it contains from the user's desktop 32.

Users will perform the second method when they want to delete the real, remote shared book 40 from the remote file service. This will affect other users of shared book 40. If other users attempt to use their local instances of shared book 40 after the real, remote shared book is deleted, they will receive an error message at their desktop 32 to the effect that the real, remote shared book doesn't exist anymore.

It is possible to delete the real, remote shared book 40 by simply opening a path to its remote location on the remote file service and deleting the remote shared book remote instance. However, this will not delete local instances of shared book 40 from users' desktops 32, nor will it delete the shared book's or its entries' records from the database service.

Thus, the recommended procedure for deleting the real, remote shared book is, to first, notify all users who have access to shared book 40 that the remote instance of the shared book is going to be deleted. Next, all of the shared book's entries should be locked and deleted from shared book window 42. This action will delete the entries' records from the database service. Then, all local instances of the shared book can be deleted from all users' desktops 32 by the respective users. Finally, the now empty real, remote shared book can be deleted from the remote file service.

L. Pagination And Page Numbering.

Pagination is the same as is already known and accomplished in VP Books, mentioned in the Background, except that only qualified Body entries 46 in shared book 40 are paginated. The difference between paginating entries in a shared book 40 and paginating files in a VP folder is that in shared book 40, page numbering can continue across document or entry boundaries. As in the case of VP Books, only VP documents are affected by pagination. Other file types, even if classed as Body entries 46 by the user, are ignored by the pagination operation. All Body entries 46 in shared book 40 may be paginated at once by selecting closed shared book icon 40. However, a user may also select and individually paginate individual entries 44 in an open shared book 40. This is useful when there is a need to print only selected entries during the course of publication preparation.

Thus, if the shared book 40 is closed and paginated, then all Body entries 46 will be affected. If the shared book is open, then entries that are selected by the user are paginated. VP documents that are classed as Auxiliary entries 48 will be ignored. All Body entries 46 in a shared book must be locked in order to correctly paginate the publication represented by shared book 40. Pagination edits the files, and, therefore, entries 46 must be locked in order to edit them. The pagination operation will automatically lock those Body entries 46 that are not already locked. In the case of closed shared book 40, all Body entries will be locked, while in the case of an open shared book only all entries 44 selected by the user will be locked. In both cases, if another user already has one or more of the affected Body entries 46 locked, as indicated by the presence of a halftone lock icon 94, then the pagination operation will terminate before any pagination takes place.

While the Body entries are being checked and locked, shared book 40 itself is locked. This means that other users cannot use the real, remote shared book on the remote file service while the pagination operation is checking and paginating Body entries 46. When pagination is complete, the remote instance of shared book 40 is released. Other users can then copy or edit the remaining entries 48 while the actual pagination is being performed on the Body entries 46.

The pagination itself is performed in the background. The user can do other work on workstation 14 while the shared book's Body entries 46 are being paginated. After the pagination operation has been accomplished, the user must unlock each of the entries 46 that were locked for pagination.

Page numbering is accomplished in the same manner as in VP Books, referenced in the Background. As is known in VP Books, page numbering will be the same as in regular documents with one exception. If an entry 44 in shared book 40 has the page numbering parameter in its initial Page Format Properties Sheet (not shown) set to "CONTINUE", then, after pagination, the page number of the first page of that entry will be the number following the number of the last page of the previous entry in shared book 40. If the parameter is set to "NONE" or "RESTART", behavior is the same as if the entry had been outside of shared book 40. Invoking "NONE" turns page numbering off, and "RESTART" forces the page number back to the number set in the page format property sheet. All other aspects of the page format property sheet remain the same as in regular documents.

The "CONTINUE" option described above only takes effect if the shared book is closed and page numbering is being performed on the whole shared book. If individual entries in the open shared book are selected and paginated, then the number of the first page of each VP entry in the selection will be 1. Invoking "NONE" and "RESTART" will behave in the manner as just described.

M. Manipulation Of A Shared Book.

Operation on an entire shared book can be accomplished by selecting shared book icon 40 and invoking an operation. The user can also select the closed shared book icon 40 and invoke a <COPY> command with destination to printer icon 38 and the publication represented by the icon will be printed with pagination preceding printing, if necessary. The user may print an entry 44 in shared book 40 by selecting the entry, invoking the <COPY> command from keyboard 25, and selecting printer icon 38 on desktop 32 as the destination. Entry 44 can be a Body entry 46 or an Auxiliary entry 48. The user may print the current version of the entire publication by selecting all Body entries 46 that make up the publication and invoking a <COPY> command with destination to printer icon 38.

It should be noted that copying shared book icon 40 to printer icon 38 results in printing only Body entries 46, not the Auxiliary entries 48. A <MOVE> command will operate in the same manner as a <COPY> command. Because printing gives the user an option of repaginating the files which are to be printed, those entries 46 which are printed will be automatically locked to the user. After the printing operation has been completed, the user should unlock the locked entries 46.

N. Manipulation Of The Local Files Of A Shared Book.

Figure 10:
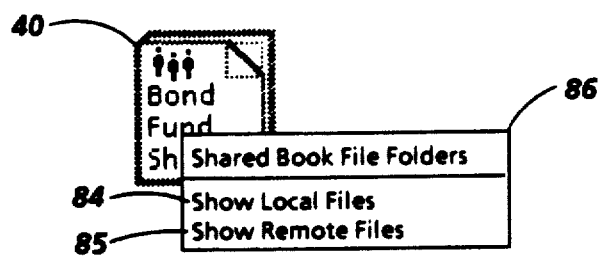
FIG. 10 illustrates the pop-up menu for the shared structured data object shown in FIG. 2.
Figure 11:
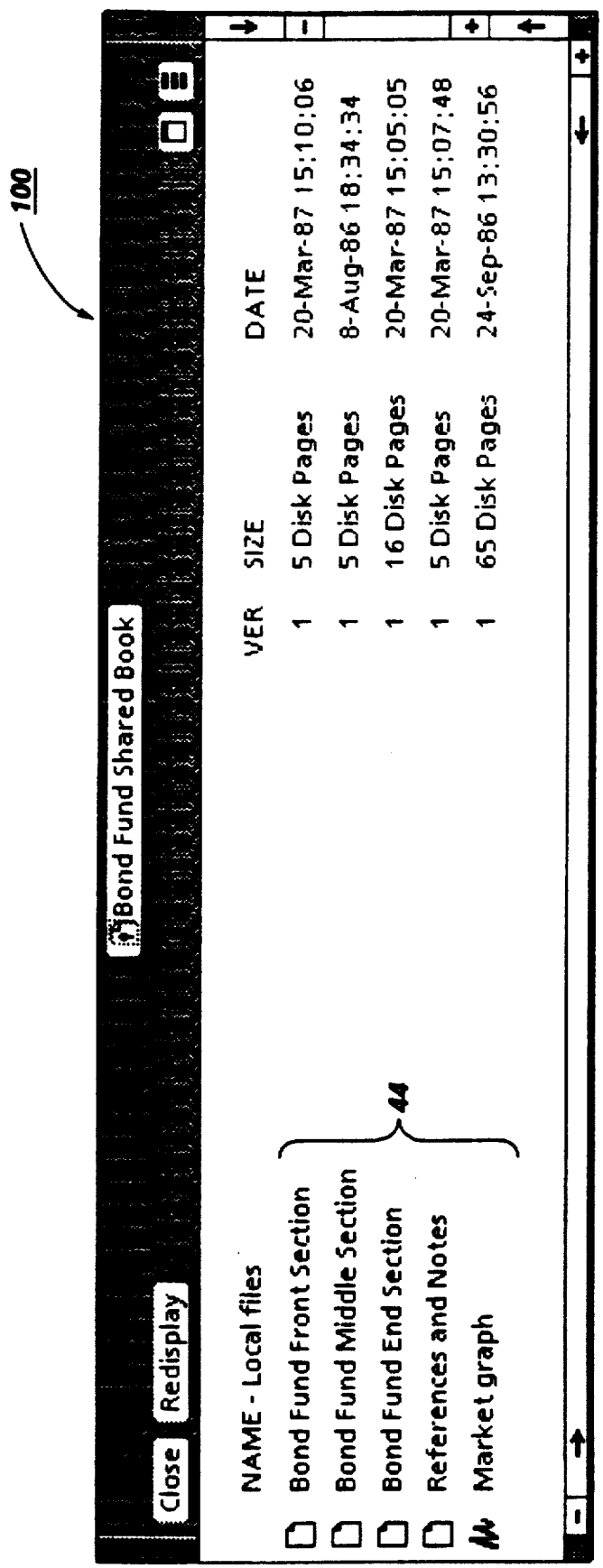
FIG. 11 illustrates an example of an open folder of local files for the shared structured data object shown in FIG. 2.

Users can manipulate a shared book's local entries 44 by opening a folder 100 of local files containing shared book entries 44, as shown in FIG. 11. There are two ways to accomplish this task. The first way is to select the "Show Local Files" command 84 from the closed icon pop-up menu 86, illustrated in FIG. 10. This menu 86 can be obtained in two ways: (1) by chording over shared book icon 40, or (2) by invoking the "shift" key from keyboard 25 and then concurrently invoking the left mouse button of mouse 30 over icon 40. The second way is to use the same "Show Local Files" command 84 in the shared book's auxiliary menu 80, illustrated in FIG. 9.

An example of a folder 100 of local files is shown in the window representation of a folder in FIG. 11. The primary purpose of local file folder 100 is to allow the selective and quick clean up of a user's desktop 32. This is accomplished by direct deleting of entries 44 within folder 100. Files deleted in this manner are not deleted from the remote file service. Users may also <COPY> or <MOVE> entries 44 from folder 100 to desktop 32. However, users may not <COPY> or <MOVE> entries 44 into folder 100 from desktop 32. The command, <PROP'S>, is also disallowed for folder 100. These restrictions help maintain the shared book's consistency. When a shared book is copied from its remote location to the user's desktop 32, all versions of each entry 44 that were stored in shared book 44 are also copied to the desktop. Thus, an important function of folder 100 of local files is to delete all but the current versions of each entry 44.

O. Manipulation Of The Remote Files Of A Shared Book.

Figure 12:
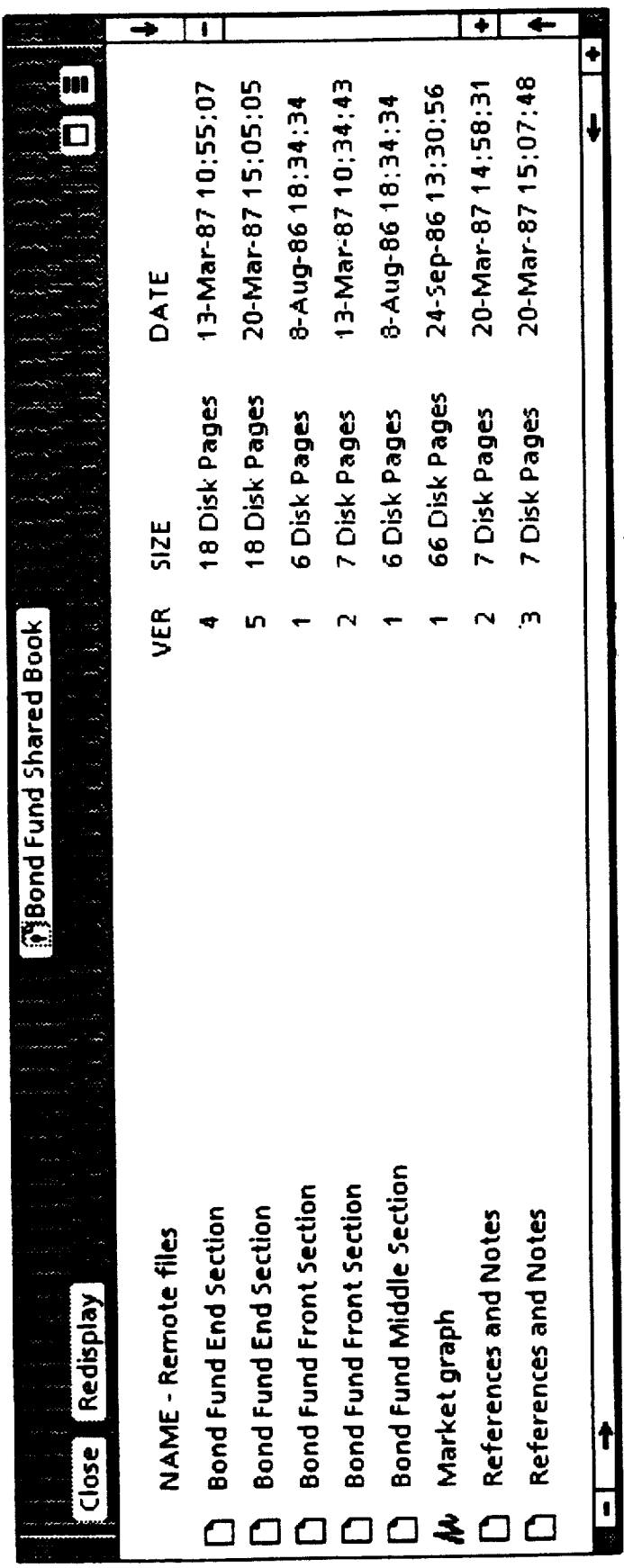
FIG. 12 illustrates an example of an open folder of remote files for the shared structured data object shown in FIG. 2.

Users can manipulate a shared book's remote entries, i.e. the ones contained in the real, remote shared book on the remote file service, by opening a folder 102 of local files containing remote shared book entries 44, as shown in FIG. 12. This folder 102 is activated by selecting the "Show Remote Files" command 85 from either the icon pop-up menu 86 in FIG. 10 or the shared book's auxiliary menu 80 in FIG. 9.

An example of a folder 102 of remote files is shown in the window representation of a folder in FIG. 12. Users may <COPY> entries 44 from folder 102 to desktop 32 or book 40. Users may not <DELETE> or <MOVE> entries 44 from or into folder 102, nor may they <COPY> entries into folder 102. The command, <PROP'S >, is also disallowed. As previously indicated, these restrictions are for maintaining shared book consistency. A primary purpose of folder 102 of remote files is to obtain previous versions of entries 44 being maintained at the remote shared book location. As previously indicated, the number of versions that are kept in shared book 40 is determined by the selection number inserted in the "Versions To Keep" field 55 in shared book property sheet 50B. The user can change this field value at any time.

P. Access Rights To Shared Books.

A new local instance of an existing shared book 40 is given the same access list of the remote shared book. A new entry 44C is initially given the access list of the shared book when it is first copied into that shared book. This also appears in access field 68 in entry Details property sheet 60B shown in FIG. 6 as "(Same As Container)".

In shared book property sheet 50B in FIG. 4, access list field 56 is always editable. Any user who can open property sheet 50B can edit this field However, if the user doesn't have Owner rights per se, the operation will fail when the user invokes the "Done" command 58. Access list field 68 in an entry Details property sheet 60A is read-only if an entry 44A is not locked by the user as per FIG. 6. When the entry is locked, the user can make changes to the access list via field 68 in FIG. 6.

If a new user is given access rights to a shared book 40, it is also necessary that that user be given similar access rights to the file drawer or folder on the remote file service for the remote shared book

TABLE I

| Access Read, Write, Add, Remove, Owner | Access rights and Shared Books operations | | | | | |
|---|---|---|---|---|---|---|
| | Entry Props (including access list) | Shared Book Props | Move Within | Copy in New Entry | Delete Entry | Save Entry |
| (none) | | | | | | |
| R (read-only) | 1 | 1 | | | | |
| R W | yes | 2 | yes | 3 | 4 | |
| R W O | yes | yes | yes | 3 | 4 | |
| R W Rm | yes | 2 | yes | 3 | 5 | |
| R W Rm O | yes | yes | yes | 3 | 5 | |
| R W A | yes | 2 | yes | yes | 4 | 6 |
| R W A O | yes | yes | yes | yes | 4 | 6 |
| R W A Rm | yes | 2 | yes | yes | 5 | 7 |
| R W A Rm O | yes | yes | yes | yes | 5 | 7 |

Key
Blank space means the action is not allowed.
1- can look, but can't change anything
2- yes, except for changing the access list
3- yes, but nobody could use the entry because it can't be saved
4- yes, but only if there are no remote copies of the entry
5- yes, but you must have write permission for the entry
6- yes, but you will get an error message because you can't delete old version of the entries
7- yes, but you might get an error message if you don't have write permission for the entry A user's interaction with a particular shared book 40 is controlled by the access rights the user has for that shared book. A user must have, at the minimum, Read access to be able to even open shared book 40 and view its contents in window 42. Write and Add access in field 56 are requisites for storing an entry 44 in a real, remote shared book at the remote file service. Remove access is required to delete an entry 44 from the real, remote shared book at the remote file service. Finally, Owner access is needed to change or modify the access list per se.

Each entry 44 has its own access list, which can be different from of the shared book access list in which the entry is contained. A user may have full access to one entry, Read-only access to another, and no access to a third entry, all within the same shared book 40. Usually, however, a user will have the same access rights to an entry 44 as the user has for shared book 40 in which the entry 44 is located.

When a new shared book 40 is created, it is automatically assigned the access list of the remote file drawer or folder that contains the shared book. This appears in field 56 of the shared book's property sheet 50B shown in FIG. 4 as:

Access list: (Same As Container)

Table I below shows the effect of various combinations of access rights on six standard shared books operations. Read and Write access are the basic access rights and others should only be used in conjunction with these two access rights.

Q. Miscellaneous.

The invention could be implemented in a wide variety of ways. For example, it could be implemented in the system described in Foster, G., *Collaborative Systems and Multi-user Interfaces*, Ph.D. Thesis, University of California, Berkeley, Computer Science Division, 1986. This implementation would use LOOPS, discussed more fully in Bobrow, D. G. and Stefik, M., *The LOOPS Manual*, Xerox Corporation, December 1983. Loops gauges could be used, as described in Stefik, M. and Bobrow, D. G., "Object-Oriented Programming: Themes and Variations," *The AI Magazine*, 1986, pp. 40-62, at page 58-60.

Another alternative would be to provide reduced scale representations of the type shown in FIG. 5 of copending, coassigned U.S. patent application Ser. No. 030,766, now U.S. Pat. No. 5,072,412 entitled "User Interface with Multiple Virtual Workspaces for Sharing Display System Objects", assigned to the assignee herein and incorporated herein by reference thereto.

These representations include the contents of a workspace in shrunken form, and could be used in combination with the techniques described in copending, coassigned U.S. patent application Ser. No. 07/127,997, now abandoned, and continued as Ser. No. 07/570,980 Shared Virtual Workspaces" and assigned to the same assignee herein and incorporated herein by reference thereto.

While the invention has been described in conjunction with specific embodiments, it is evident to those skilled in the art that many alternatives, modifications and variations will be apparent in light of the foregoing description. Accordingly, the invention is intended to embrace all such alternatives, modifications and variations as fall within the spirit and scope of the appended claims.

What is claimed is:

1. A method for operating a collaborative system that includes a plurality of workstations each having a respective display, a respective user input device, and a respective local memory; the collaborative system further including storage means for storing shared data; each of the workstations being connected for accessing the shared data stored by the storage means to retrieve the shared data for storage in the respective local memory and for presentation on the respective display; the method comprising steps of:

receiving from the respective user input device of a first one of the workstations a signal requesting an operation affecting the shared data; and in response to the signal requesting the operation, performing the following acts substeps of:

locking the shared data stored by the storage means to prevent other operations affecting the shared data;

determining whether an up-to-date copy of the affected shared data is stored in the respective local memory of the first workstation;

if an up-to-date copy of the affected shared data is not stored in the respective local memory of the first workstation, storing an up-to-date copy of the affected shared data in the respective local memory of the first workstation;

performing the requested operation by making a change in the up-to-date copy of the affected shared data stored in the respective local memory of the first workstation;

updating the shared data stored by the storage means to include the change made by performing the requested operation; and unlocking the shared data stored by the storage means after the shared data stored by the storage means is updated.

2. The method of claim 1 in which the shared data includes a set of parts, the method further comprising a step of presenting on the respective display of each of the workstations a respective local representation of the shared data; the local representation of the shared data including a respective representation of a first one of the parts of the shared data.

3. The method of claim 2 in which the shared data is a book data object, the first part of the shared data being a first document data object defining a respective set of pages.

4. The method of claim 2 in which the step of presenting a respective local representation of the shared data comprises presenting a respective local representation that includes, in the respective representation of the first part, an icon indicating a local copy of the first part of the shared data if a local copy of the first part is stored in the respective local memory.

5. The method of claim 1, further comprising steps of:

after receiving the signal requesting the operation from the first workstation, receiving from the respective user input device of a second one of the workstations a second signal requesting a second operation affecting the shared data stored by the storage means; and determining whether to perform the requested second operation based on whether the shared data stored by the storage means is locked.

* * * * *

UNITED STATES PATENT AND TRADEMARK OFFICE
CERTIFICATE OF CORRECTION

PATENT NO. : 5,220,657
DATED : June 15, 1993
INVENTOR(S) : Sara A. Bly, Jeffrey D. Hodges, Michael D. Kupfer, Brian T. Lewis, Michael L. Tallan, Stephen B. Tom It is certified that error appears in the above-indentified patent and that said Letters Patent is hereby corrected as shown below:

Column 39, line 5: Change "Ser. No. 07/570,980," to --"Ser. No. 07/570,984, entitled "Multiple--.".

In Claim 1, at column 39, line 32, delete "the following acts".

Signed and Sealed this

Nineteenth Day of April, 1994

Attest:

BRUCE LEHMAN

*Attesting Officer*  *Commissioner of Patents and Trademarks*